United States Patent
Hallberg et al.

(10) Patent No.: US 12,134,337 B2
(45) Date of Patent: Nov. 5, 2024

(54) POWER SUPPLY SYSTEM CAPABLE OF SWITCHING BETWEEN A CHARGING MODE AND A POWER SUPPLY MODE FOR AN ELECTRIC VEHICLE DRIVETRAIN

(71) Applicants: Ningbo Geely Automobile Research & Development Co., Ltd., Ningbo (CN); Zhejiang Geely Holding Group Co., Ltd., Zhejiang (CN)

(72) Inventors: Linus Hallberg, Säve (SE); Naveen Raja Rajarathinam, Gothenburg (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 39 days.

(21) Appl. No.: 18/078,976

(22) Filed: Dec. 11, 2022

(65) Prior Publication Data

US 2023/0105731 A1    Apr. 6, 2023

Related U.S. Application Data

(63) Continuation of application No. PCT/CN2021/100702, filed on Jun. 17, 2021.

(30) Foreign Application Priority Data

Aug. 27, 2020 (EP) ..................... 20193154

(51) Int. Cl.
*B60L 58/19* (2019.01)
*B60L 58/18* (2019.01)
(Continued)

(52) U.S. Cl.
CPC .............. *B60L 58/19* (2019.02); *B60L 58/18* (2019.02); *B60L 58/20* (2019.02); *B60L 58/21* (2019.02);
(Continued)

(58) Field of Classification Search
CPC .......... B60L 58/18; B60L 58/19; B60L 58/21; H02J 7/0024
(Continued)

(56) References Cited

U.S. PATENT DOCUMENTS 5,712,553 A    1/1998  Hallberg
5,862,515 A *  1/1999  Kobayashi ........... G01R 31/389
                                             340/636.11
(Continued)

FOREIGN PATENT DOCUMENTS

CN    108206566 A    6/2018
CN    111546944 A    8/2020
(Continued)

OTHER PUBLICATIONS

Du et al, "The Influence of High Power Charging on the Lithium Battery Based on Constant and Pulse Current Charging Strategies", 2020, 2020 IEEE Vehicle Power and Propulsion Conference, all pages. (Year: 2020).*

(Continued)

*Primary Examiner* — Adi Amrany
(74) *Attorney, Agent, or Firm* — Tucker Ellis LLP

(57) ABSTRACT

A power supply system for an electric vehicle drivetrain includes series connected first and second high-voltage battery units, a circuit arrangement having high-power switching semiconductor devices connected to the battery units, and an electronic control system. During a charging mode, the control system controls the semiconductor devices to route high-voltage DC from a vehicle external charging source alternatingly to the battery units. During a power supply mode, the control system controls the operation of the semiconductor devices to supply high-voltage DC from both the battery units for driving a vehicle electrical traction machine of the electric vehicle drivetrain, wherein (Continued)

the supplied high-voltage DC has a voltage level corresponding to an accumulated voltage level of the series connected battery units.

17 Claims, 11 Drawing Sheets

(51) Int. Cl.
 *B60L 58/20*   (2019.01)
 *B60L 58/21*   (2019.01)
 *H02J 7/00*   (2006.01)

(52) U.S. Cl.
 CPC ....... *H02J 7/0048* (2020.01); *B60L 2240/547* (2013.01); *H02J 2310/48* (2020.01)

(58) Field of Classification Search
 USPC .......................................................... 307/71
 See application file for complete search history.

(56) References Cited

U.S. PATENT DOCUMENTS

| | | | |
|---|---|---|---|
| 9,685,810 | B1 | 6/2017 | Bhardwaj |
| 10,186,887 | B2* | 1/2019 | Wang ...................... B60L 58/12 |
| 11,336,109 | B2* | 5/2022 | Hung .................... H02J 7/0019 |
| 2001/0010456 | A1* | 8/2001 | Kaite .................... H02J 7/0019 |
| | | | 320/125 |
| 2011/0089898 | A1 | 4/2011 | Lee |
| 2015/0295431 | A1* | 10/2015 | Honda .................. H02J 7/0025 |
| | | | 320/152 |
| 2016/0006278 | A1 | 1/2016 | Sakakibara |
| 2016/0107535 | A1 | 4/2016 | Delobel |
| 2016/0204624 | A1* | 7/2016 | Small, Jr. .............. H02J 7/0047 |
| | | | 320/139 |
| 2017/0302088 | A1 | 10/2017 | Tkachenko |
| 2018/0072178 | A1* | 3/2018 | Williams .................. B60L 1/00 |
| 2018/0345806 | A1* | 12/2018 | Lee .......................... B60L 58/19 |
| 2019/0027792 | A1 | 1/2019 | Sun |
| 2019/0288528 | A1 | 9/2019 | Greetham |
| 2020/0070667 | A1* | 3/2020 | Wang ....................... B60L 58/19 |
| 2020/0180470 | A1* | 6/2020 | Doersam ................. B60L 58/19 |
| 2020/0185936 | A1* | 6/2020 | Oishi ..................... H02J 7/0024 |
| 2020/0282861 | A1* | 9/2020 | Kim ....................... H02J 7/0014 |
| 2021/0013731 | A1* | 1/2021 | Choe ........................ B60L 53/00 |
| 2021/0066947 | A1* | 3/2021 | Du ..................... H02J 7/007182 |
| 2021/0152011 | A1* | 5/2021 | Deng ..................... H01M 10/482 |
| 2021/0231739 | A1* | 7/2021 | Hong ...................... B60L 58/14 |
| 2022/0231537 | A1* | 7/2022 | Hirota ....................... H02J 7/16 |
| 2023/0039183 | A1* | 2/2023 | Ohkawa ................. G01R 31/374 |

FOREIGN PATENT DOCUMENTS

| | | |
|---|---|---|
| DE | 102016225513 A1 | 6/2018 |
| DE | 102017116107 A1 | 10/2018 |
| JP | 05114422 A * | 5/1993 |
| JP | 2016178859 A | 10/2016 |

OTHER PUBLICATIONS

International Search Report from corresponding International Patent Application No. PCT/CN2021/100702, dated Sep. 24, 2021, 2 pages.

* cited by examiner

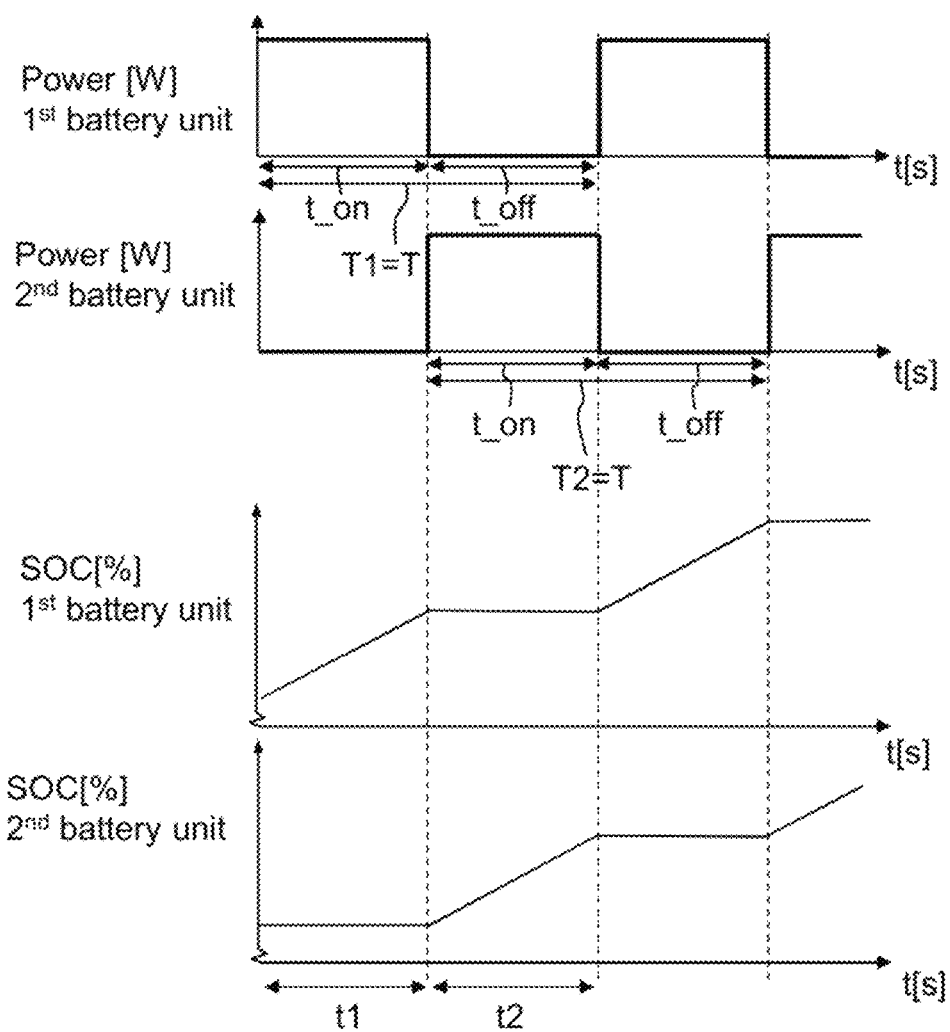

POWER SUPPLY SYSTEM CAPABLE OF SWITCHING BETWEEN A CHARGING MODE AND A POWER SUPPLY MODE FOR AN ELECTRIC VEHICLE DRIVETRAIN

RELATED APPLICATION DATA

This application is a continuation of International Patent Application No. PCT/CN2021/100702, filed Jun. 17, 2021, which claims the benefit of European Patent Application No. 20193154.0, filed Aug. 27, 2020, the disclosures of which are incorporated herein by reference in their entireties.

TECHNICAL FIELD

The present disclosure relates to a power supply system for an electric vehicle drivetrain and a method for operating a power supply system for an electric vehicle drivetrain.

The power supply system according to the disclosure can be arranged in any type of vehicle, and even if the system and method according to the disclosure will be described primarily in relation to a car, the system and method is not restricted to this particular vehicle, but may as well be installed or implemented in another type of vehicle, such as a truck, a bus, a rail vehicle, a flying vehicle, a marine vessel, an off-road vehicle, a working vehicle, a motorcycle or the like.

BACKGROUND

In the field of power supply systems for electric vehicles, there is a trend towards increased voltage level of the power supply system because it enables shorter charging time. For example, a 800 V High-voltage power supply system has the ability to be charged at a power level of 300 kW, thereby enabling full charging of a 100 kWh battery in less than 30 minutes.

On the other hand, a drawback with the 800V power supply system is generally the need of a DC/DC converter within the vehicle, because conventional Fast Charging stations present across the globe has a charging voltage of 400 V. Hence, a 400 V to 800 V DC/DC converter is typically required, thereby increasing cost and complexity of the power supply system. Moreover, the DC/DC converter typically has a limited power level, for example in the range of 20-100 kW, thereby resulting in longer charging time period.

It is also known for example from document DE102016225513 to apply sequential charging of two battery units.

However, despite the activities in the field, there is still a demand for a further improved power supply system that is capable of providing high-voltage level combined with fast charging from conventional charging stations at a low cost.

SUMMARY

An object of the present disclosure is to provide a power supply system for an electric vehicle, and corresponding method for operating a power supply system where the previously mentioned problems are avoided. This object is at least partly achieved by the features of the independent claims.

According to a first aspect of the present disclosure, there is provided a power supply system for an electric vehicle drivetrain. The power supply system comprising: a first high-voltage battery unit; a second high-voltage battery unit connected in series with the first high-voltage battery unit; a circuit arrangement having a plurality of high-power switching semiconductor devices connected to the first and second high-voltage battery units; and an electronic control system. The electronic control system is configured for controlling operation of the plurality of high-power switching semiconductor devices for: during a charging mode of the first and second high-voltage battery units, routing high-voltage DC received from a vehicle external charging source alternatingly to the first high-voltage battery unit and to the second high-voltage battery unit, with an alternating frequency of at least 100 Hz, specifically at least 500 Hz, and more specifically in the range of 100-10000 Hz; and during a power supply mode of the power supply system, supplying high-voltage DC from both the first and second high-voltage battery units for driving a vehicle electrical traction machine of the electric vehicle drivetrain, wherein the supplied high-voltage DC has a voltage level corresponding to the accumulated voltage level of the series connected first and second high-voltage battery units.

According to a second aspect of the present disclosure, there is provided a method for operating a power supply system for an electric vehicle drivetrain. The power supply system includes a first high-voltage battery unit connected in series with a second high-voltage battery unit. The method comprises, during a charging mode of the first and second high-voltage battery units, routing, by means of a circuit arrangement having a plurality of high-power switching semiconductor devices connected to the first and second high-voltage battery units, high-voltage DC received from a vehicle external charging source alternatingly to the first high-voltage battery unit and to the second high-voltage battery unit, with an alternating frequency of at least 100 Hz, specifically at least 500 Hz, and more specifically in the range of 100-10000 Hz, and during a power supply mode of the power supply system, supplying, by means of said circuit arrangement, high-voltage DC from both the first and second high-voltage battery units for driving a vehicle electrical traction machine of the electric vehicle drivetrain, wherein the supplied high-voltage DC has a voltage level corresponding to the accumulated voltage level of the series connected first and second high-voltage battery units.

In this way, it becomes possible to provide the vehicle with for example a 800V electrical storage system, thereby enabling high power output of the electrical propulsion machine, while still enabling charging of the electrical storage system using conventional 400V charging station but without requiring a costly and power-limiting 800V/400V DC/DC converter. Moreover, the relatively fast alternating frequency of at least 100 Hz enables battery pulse charging instead of conventional CC-CV charging.

During conventional DC charging, there are typically two major parts: the initial charging part where the charging is done by maintaining a constant current (CC) and the second part where the charging is done with a constant voltage (CV). This is called CC-CV charging, but CC-CV charging for charging HV Battery may have a negative impact on the lifetime of the HV Battery.

Pulsed charging of for example Li-Ion batteries with pulse frequency of at least 100 Hz on the other hand can improve battery lifetime. Pulse charging involves using controlled charge current pulses to charge each battery unit. Compared with CC-CV charging, pulse charging provides increased battery charge, reduced charge time and improved safety, since the relaxation times in between charge current pulses allows time for positive ions to successfully intercalate in the anode and may help to prevent dendrite formation.

In other words, by configuring the battery cells of the high-voltage battery system into two stacks of cells, or two separate battery units, that each has about 50% of the total voltage, it is possible to charge one half of the battery pack at a time with a short current pulse at about 50% of the total voltage level, and after charging having access to the total voltage level for electric vehicle propulsion. This enables charging of for example a 800V battery at a 400V charging station. Moreover, by alternatively charging the battery cell stacks, one part of the HV battery is always being charged by the high current pulses, such that the need for a separate 400/800V DC/DC converter to handle 400V charging stations is eliminated, and the pulse charging results in increased lifetime of the battery.

Further advantages are achieved by implementing one or several of the features of the dependent claims.

In some example embodiments, the electronic control system is configured for controlling operation of the plurality of high-power switching semiconductor devices to operate with an alternating frequency equal to a frequency associated with a battery minimal internal resistance or battery minimal internal impedance of the first and/or second high-voltage battery unit; or a frequency located between a frequency associated with battery minimal internal resistance or battery minimal internal impedance of the first high-voltage battery unit and a frequency associated with battery minimal internal resistance or battery minimal internal impedance of the second high-voltage battery unit. Thereby, the internal resistance losses associated with the first and/or second high-voltage battery units during charging thereof may be minimized. Battery impedance can be examined by electrochemical impedance spectroscopy, so that the frequency with minimal resistive impedance can be identified and used for the pulsed charging current.

In some example embodiments, the power supply system further comprises a battery internal resistance or impedance detection arrangement configured for determining said frequency associated with said minimal internal resistance or minimal internal impedance of the first and/or second high-voltage battery units. Thereby, online detection of the minimal internal resistance or minimal internal impedance of the first and/or second high-voltage battery units may be detected and subsequently used during charging of said battery units.

In some example embodiments, the battery internal resistance or impedance detection arrangement is configured for first, for each of a set of different frequencies, supplying a AC signal having a certain frequency to a selected battery unit out of the first and second high-voltage battery units or to both the first and second high-voltage battery units, registering a resulting alternating voltage or current, and determining an internal impedance of the selected battery unit or both the first and second high-voltage battery units, and secondly, identifying the minimal internal resistance or minimal internal impedance of the selected battery unit or both the first and second high-voltage battery units from the collected set of internal impedances, and determining the frequency associated with said identified minimal internal resistance or minimal internal impedance. Thereby, a cost-effective and easily implemented approach for online detection of the minimal internal resistance or minimal internal impedance of the first and/or second high-voltage battery units is accomplished.

In some example embodiments, the electronic control system comprises a data memory having, for each of the first and second high-voltage battery units or jointly for both the first and second high-voltage battery units, a plurality of stored data records, each associated with: a unique combination of a battery state of charge value and a battery temperature value; a data field for storing a calculated frequency value reflecting a minimal internal resistance or minimal internal impedance of the battery at said unique combination of battery state of charge and battery temperature; and a data field for storing an age indicator indicating the age of the calculated frequency value, wherein the electronic control system is configured to, upon receiving an instruction to enter charging mode of the first and second high-voltage battery units, detecting current temperature level and current state of charge level associated with the first and/or second high-voltage battery units, and subsequently using an associated calculated frequency value from the data record as the alternating frequency if the associated age indicator indicates that the calculated frequency value is up-to-date.

The data memory having a plurality of stored data records may be deemed corresponding to a lookup data table having stored frequency values and associated age indicators for enabling swift identification of suitable alternating frequency for charging.

In some example embodiments, the electronic control system is configured to, upon detecting that the associated age indicator indicates an outdated calculated frequency value, applying the battery internal resistance or impedance detection arrangement for determining a new calculated frequency value reflecting the minimal internal resistance or minimal internal impedance of each of the first and second high-voltage battery units, updating the stored calculated frequency value and the age indicator in the data record, and using said updated calculated frequency value as the alternating frequency. Thereby, it is ensured that a reasonable valid and suitable alternating frequency value always is used during charging without requiring a new online calculation of minimal impedance of the battery units at the beginning of each charging event.

In some example embodiments, the first high-voltage battery unit in a fully charged state has a first voltage level, wherein the second high-voltage battery unit in a fully charged state has a second voltage level that does not differ more than 10% from the first voltage level, wherein the circuit arrangement is configured for routing a high-voltage DC from the vehicle external charging source to each of the first and second high-voltage battery units having a third voltage level that does not differ more than 10% from any of the first and second voltage levels, and wherein the circuit arrangement is configured for supplying a high-voltage DC for driving the vehicle electrical traction machine at a power supply output having a fourth voltage level that amounts to substantially the sum of the first and second voltage levels. Consequently, charging of for example 800V battery system, composed of two series connected 400V battery units, may be performed using a conventional 400V charger without requiring a 400/800 DC/DC converter for converting a 400V charging voltage to 800V battery voltage.

In some example embodiments, the power supply system comprises a charging inlet configured for, during a charging mode of the first and second high-voltage battery units, receiving high-voltage DC from a vehicle external charging source for charging of the first and second high-voltage battery units, and wherein the power supply system is free from a DC/DC converter in the charging current path between the charging inlet and the first and second high-voltage battery units. Thereby, the overall cost of the power supply system may be reduced and the charging power may be increased.

In some example embodiments, the power supply system comprises a first bypass line connected in parallel with the first high-voltage battery unit, wherein the first bypass line includes a first high-power switching semiconductor device for controlling a bypass current flowing through the first bypass line, and a second bypass line connected in parallel with the second high-voltage battery unit, wherein the second bypass line includes a second high-power switching semiconductor device for controlling a bypass current flowing through the second bypass line. Thereby, a cost-efficient and reliable switching of the charging current is accomplished for implementing the desired alternating frequency.

In some example embodiments, the power supply system additionally comprises a third high-power switching semiconductor device connected in series with the first high-voltage battery unit and configured for selectively isolating the first high-voltage battery unit from the power supply system, and a fourth high-power switching semiconductor device connected in series with the second high-voltage battery unit and configured for selectively isolating the second high-voltage battery unit from the power supply system. Thereby, a cost-efficient and reliable switching of the charging current is accomplished for implementing the desired alternating frequency.

In some example embodiments, the power supply system comprises a first DC/DC converter connected in parallel with the first high-voltage battery unit and configured for providing a first low-voltage DC output, and a second DC/DC converter connected in parallel with the second high-voltage battery unit and configured for providing a second low-voltage DC output. Thereby, a redundant low-voltage power supply is accomplished for vehicle safety critical loads.

According to some example embodiments, the alternating frequency can be at least 1 kHz, or at least 2 kHz, or in the range of 0.5-100 kHz, or 1-50 kHz, or 1-25 kHz or 2-15 kHz.

The disclosure also relates to a vehicle comprising the power supply system as described above.

In some example embodiments, the power supply system includes, for each of the first and second high-voltage battery units or jointly for both the first and second high-voltage battery units, a lookup data table having a plurality calculated frequency values, each reflecting a minimal internal resistance or minimal internal impedance of the battery for a unique combination of battery state of charge and battery temperature and each being associated with an age indicator indicating the age of the calculated frequency value, and wherein the method described above further comprises the steps of: receiving an instruction to enter charging mode of the first and second high-voltage battery units; detecting current temperature level and current state of charge level associated with the first and/or second high-voltage battery units; obtaining from the lookup data table the associated age indicator of the corresponding calculated frequency value; and when the associated age indicator indicates that the calculated frequency value is up-to-date, using the calculated frequency value from the lookup data table as the alternating frequency. Thereby, a reasonably valid and correct frequency value for the alternating frequency may be obtained without requiring online calculating of the frequency associated with the minimal impedance of the battery units.

In some example embodiments, the method further comprises: when the associated age indicator indicates that the calculated frequency value is outdated, applying a battery internal resistance or impedance detection arrangement for determining a new frequency value reflecting the minimal internal resistance or minimal internal impedance of each of the first and second high-voltage battery units; updating the stored calculated frequency value and the age indicator in the lookup data table; and using said new, updated, calculated frequency value as the alternating frequency. Thereby, the frequency value of the lookup data table to be used as alternating frequency may be updated and ready for use for near future charging events.

In some example embodiments, the step of applying the battery internal resistance or impedance detection arrangement for determining a new calculated frequency value reflecting the minimal internal resistance or minimal internal impedance of each of the first and second high-voltage battery units involves: for each of a set of different frequencies, supplying an AC signal having a certain frequency to a selected battery unit out of the first and second high-voltage battery units or to both the first and second high-voltage battery units, registering a set of resulting alternating voltages, and determining a set of internal impedances of the selected battery unit or both the first and second high-voltage battery units; and subsequently identifying the minimal internal resistance or minimal internal impedance of the selected battery unit or both the first and second high-voltage battery units from the collected set of internal impedances, and determining the frequency associated with said identified minimal internal resistance or minimal internal impedance. Thereby, a cost-effective and easily implemented approach for online detection of the minimal internal resistance or minimal internal impedance of the first and/or second high-voltage battery units is accomplished.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The disclosure will be described in detail in the following, with reference to the attached drawings, in which FIGS. 5A-5B show schematically the pulsed charging currents of the first and second high-voltage battery units and the change in state of charge, respectively.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Figure 1:
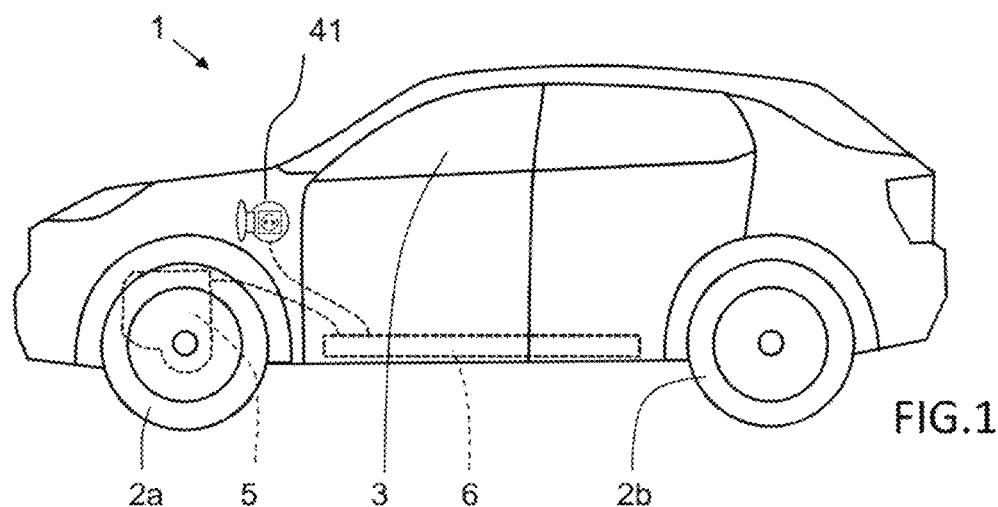
FIG. 1 shows schematically a side view of a vehicle having a power supply system according to the disclosure.

FIG. 1 schematically shows a side view of an electric vehicle 1 having front wheels 2a, rear wheels 2b, a passenger compartment 3 and an electric vehicle drivetrain, which includes a high-voltage battery 6 connected to an electrical machine 5, for example via a power converter such as an inverter or the like. An output shaft of the electric machine 5 is drivingly connected the front and/or rear wheels 2a, 2b, of the vehicle. The drivetrain further comprises a charging inlet 41 configured for receiving a charging connector of a charging station during charging of the high-voltage battery 6.

During charging of the high-voltage battery 6, electrical charge is supplied to the high-voltage battery 6 from the charging station via the charging inlet 41, and during vehicle driving, electrical charge is supplied from the high-voltage battery 6 to the electrical machine 5 for propulsion of the vehicle.

The high-voltage battery 6 may comprises two parts, namely a first high-voltage battery unit and a second high-voltage battery unit.

Figures 2, 3:
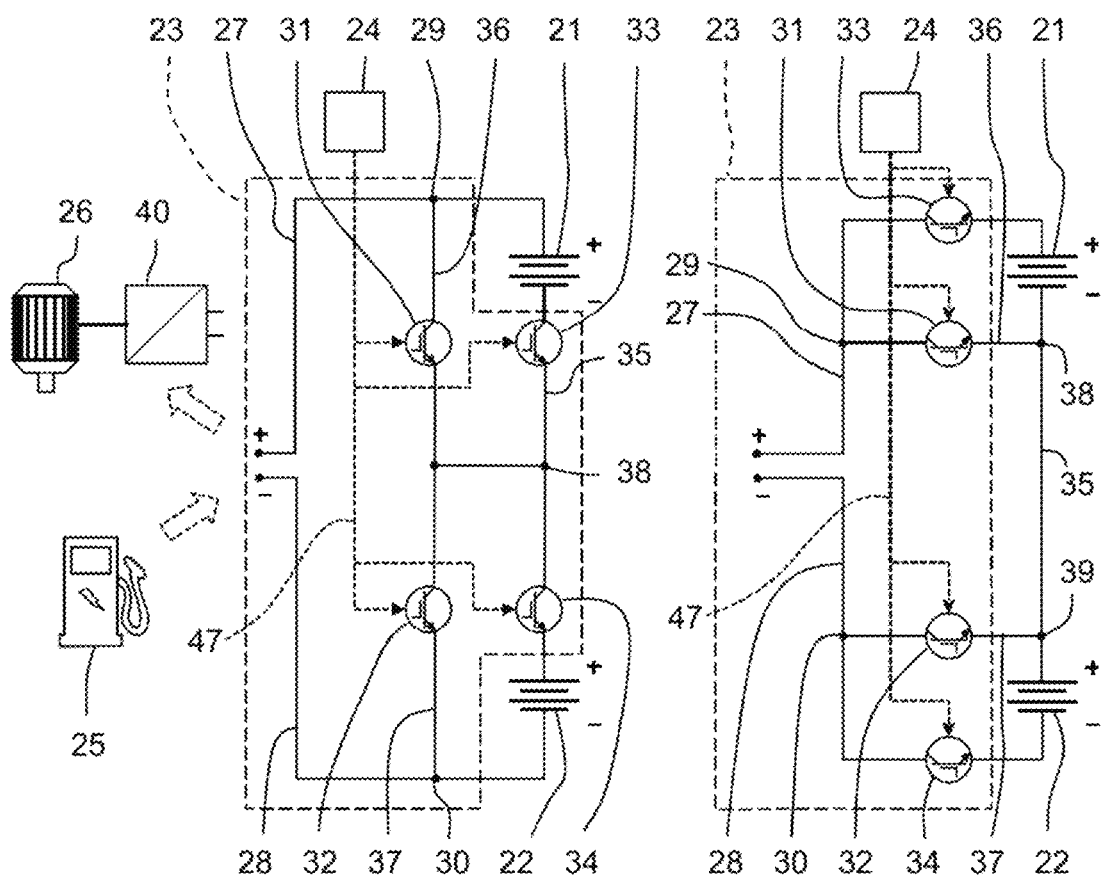
FIGS. 2-3 show schematically two alternative layouts of a circuit arrangement of the power supply system according to the disclosure.

The drivetrain includes a power supply system for controlling and operating the drivetrain. FIG. 2 shows a first example embodiment of the power supply system for the electric vehicle drivetrain. The power supply system comprises a first high-voltage battery unit 21, a second high-voltage battery unit 22 connected in series with the first high-voltage battery unit 21, a circuit arrangement 23 having a plurality of high-power switching semiconductor devices 31-34 connected to the first and second high-voltage battery units 21, 22, and an electronic control system 24 configured for controlling operation of the plurality of high-power switching semiconductor devices 31-34.

Specifically, the electronic control system 24 is configured for controlling operation of the plurality of high-power switching semiconductor devices 31-34 for, during a charging mode of the first and second high-voltage battery units 21, 22, routing high-voltage DC received from a vehicle external charging source 25 alternatingly to the first high-voltage battery unit 21 and to the second high-voltage battery unit 22, with an alternating frequency of at least 100 Hz, specifically at least 500 Hz, and more specifically in the range of 100-10000 Hz.

Furthermore, the electronic control system 24 is also configured for controlling operation of the plurality of high-power switching semiconductor devices 31-34 for, during a power supply mode of the power supply system, supplying high-voltage DC from both the first and second high-voltage battery units 21, 22 for driving a vehicle electrical traction machine 26 of the electric vehicle drivetrain, wherein the supplied high-voltage DC has a voltage level corresponding to the accumulated voltage level of the series connected first and second high-voltage battery units 21, 22.

The step of routing high-voltage DC alternatingly to the first high-voltage battery unit 21 and to the second high-voltage battery unit 22, with an alternating frequency of at least 100 Hz, means that the high-voltage DC is routed in an alternating manner to the first high-voltage battery unit 21 and to the second high-voltage battery unit 22, i.e. sequentially to the first high-voltage battery unit 21 and to the second high-voltage battery unit 22, one after the other.

By routing high-voltage DC alternatingly to the first high-voltage battery unit 21 and to the second high-voltage battery unit 22 with a certain alternating frequency, the desired pulse charging of each of the first and second high-voltage battery units 21, 22 is automatically accomplished, because when routing charging DC to the first high-voltage battery unit 21, the second high-voltage battery unit 22 is bypassed and thus isolated from the charging DC, and when routing charging DC to the second high-voltage battery unit 22, the first high-voltage battery unit 21 is bypassed and thus isolated from the charging DC. Thereby, each of the first and second high-voltage battery units 21, 22 is intermittently charge, i.e. pulse charged.

Depending on various battery design parameters, such as materials, layout, packaging, cooling of the first and second high-voltage battery units 21, 22, and/or current operating conditions, such as state of charge, battery temperature, charging current, duty cycle, voltage levels, etc., the alternating frequency used during charging may be for example at least 1 kHz, or at least 2 kHz, or in the range of 0.5-100 kHz, or 1-50 kHz, or 1-25 kHz or 2-15 kHz, or the like.

The circuit arrangement 23 with the plurality of high-power switching semiconductor devices 31-34 for routing a high-voltage DC from the vehicle external charging source 25 to each of the first and second high-voltage battery units 21, 22, and for supplying a high-voltage DC from the first and second high-voltage battery units 21, 22 to the vehicle electrical traction machine 26, may be designed and implemented by various alternative circuit layouts for accomplishing the desired tasks. Two example designs of the circuit arrangement 23 are described below with reference to FIGS. 2 and 3, but the circuit arrangement 23 is not restricted to any of these two designs, and other circuit arrangements 23 for accomplishing the desired routing are possible.

The circuit layout of the example embodiment of the power supply system of FIG. 2 is described more in detail hereinafter. Specifically, the first and second high-voltage battery units 21, 22 are connected in series, i.e. a positive pole of the second high-voltage battery unit 22 is connected to a negative pole of the first high-voltage battery unit 21 via a battery intermediate conductor 35. Moreover, a positive pole of the first high-voltage battery unit 21 is connected to a positive DC bus 27, and a negative pole of the second high-voltage battery unit 22 is connected to a negative DC bus 27.

The circuit arrangement 23 has a first high-power switching semiconductor device 31 is configured for operating as bypass of the first high-voltage battery unit 21, and a second high-power switching semiconductor device 32 is configured for operating as bypass of the second high-voltage battery unit 22. For enabling this functionality, the first high-power switching semiconductor device 31 is arranged in a first conductor 36 that has a first end connected to the positive DC bus 27 at a first connection point 29 and a second end connected to the battery intermediate conductor 35 at a second connection point 38. Similarly, the second high-power switching semiconductor device 32 is arranged in a second conductor 37 that has a first end connected to the negative DC bus 28 at a third connection point 30 and a second end connected to the battery intermediate conductor 35, for example at the second connection point 38.

The circuit arrangement 23 further has a third high-power switching semiconductor device 33 arranged in series with the first high-voltage battery unit 21, for example somewhere between the first connection point 29 and the second connection point 38. In addition, the circuit arrangement 23 further has a fourth high-power switching semiconductor device 34 arranged in series with the second high-voltage battery unit 22, for example somewhere between the second connection point 38 and the third connection point 30. Consequently, the first high-power switching semiconductor device 31 is configured for operating as bypass also of the third high-power switching semiconductor device 33, and the second high-power switching semiconductor device 32 is configured for operating as bypass also of the fourth high-power switching semiconductor device 34.

FIG. 3 schematically illustrates a further example embodiment of the circuit layout, which conceptually corresponds to the circuit layout as shown in FIG. 2, and thus has essentially the same functionality and operating behaviour. Reference is therefore made to the description of FIG. 2 for layout and operation of the first to fourth high-power switching semiconductor devices 31-34.

The circuit layout of FIG. 3 merely differs slightly in terms of circuit layout, for example, the first conductor 36 is connected to the positive DC bus 27 at a first connection point 29 and to the battery intermediate conductor 35 at a second connection point 38, whereas the second conductor 37 is connected to the negative DC bus 28 at a third connection point 30 and to the battery intermediate conductor 35 at a fourth connection point 39.

For each of the circuit layouts of FIGS. 2 and 3, during charging of the first and second high-voltage batteries 21, 22, the first to fourth high-power switching semiconductor devices 31-34 operate with a synchronised switching frequency of at least 100 Hz for continuously switching between a first charging state and a second charging state, thereby supplying charging power from the charging source 25 alternatingly to the first high-voltage battery unit 21 and to the second high-voltage battery unit 22.

Figures 4A, 4B:
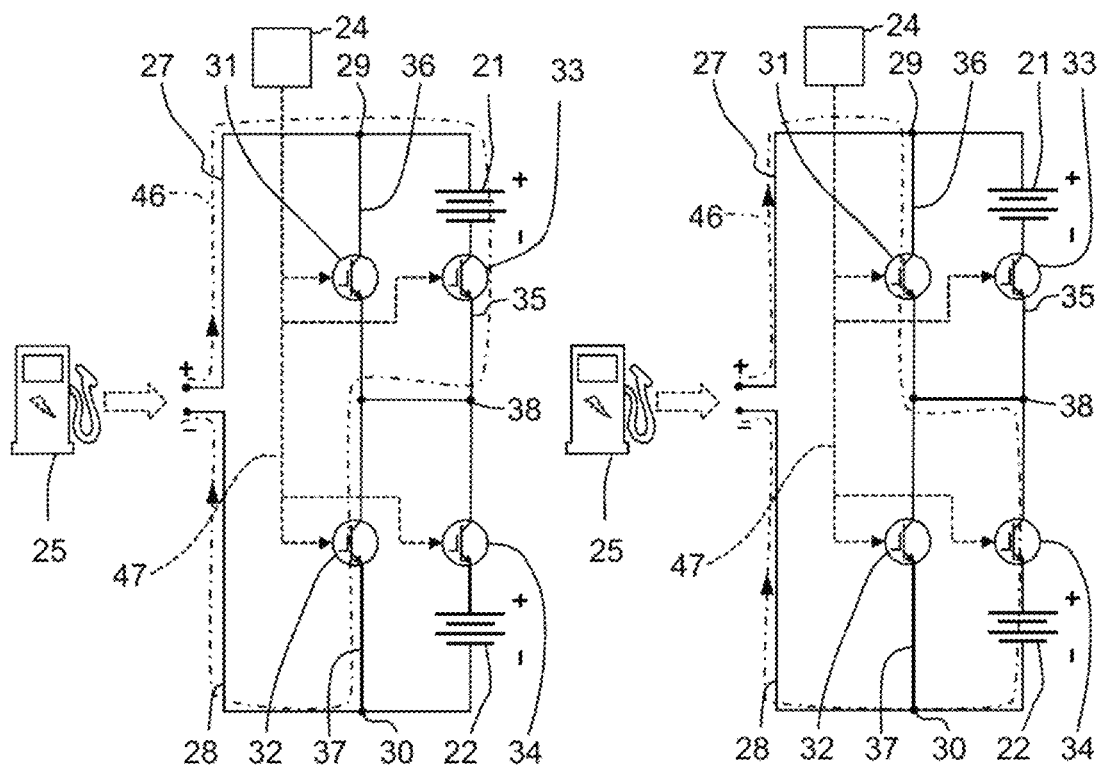
FIGS. 4A-4C show schematically the various operating states during charging and operation of the power supply system according to the disclosure.

The first and second charging states are schematically illustrated in FIGS. 4A and 4B, respectively, wherein the dash-dotted line 46 illustrates the current path.

Specifically, with reference to FIG. 4A, in the first charging state, the electronic control system 24 controls the first and fourth high-power switching semiconductor devices 31, 34 to be in an open state, i.e. non-conducting state, and the second and third high-power switching semiconductor devices 32, 33 to be in a closed state, i.e. a conducting state. As a result, charging power from the charging source 25 is supplied to the first high-voltage battery unit 21 via the second and third high-power switching semiconductor devices 32, 33, but not to the second high-voltage battery unit 22, because the second high-voltage battery unit 22 isolated by means of the fourth high-power switching semiconductor device 34 being in open state, and because the second high-voltage battery unit 22 is bypassed by means of the second high-power switching semiconductor device 32 being in closed state.

Furthermore, with reference to FIG. 4B, in the second charging state, the electronic control system 24 controls the second and third high-power switching semiconductor devices 32, 33 to be in an open state, i.e. non-conducting state, and the first and fourth high-power switching semiconductor devices 31, 34 to be in a closed state, i.e. a conducting state. As a result, charging power from the charging source 25 is supplied to the second high-voltage battery unit 22 via the first and fourth high-power switching semiconductor devices 31, 34, but not to the first high-voltage battery unit 21, because the first high-voltage battery unit 21 is isolated by means of the third high-power switching semiconductor device 33 being in open state, and because the first high-voltage battery unit 21 is bypassed by means of the first high-power switching semiconductor device 31 being in closed state.

Consequently, each of the first and second high-voltage batteries 21, 22 may be charged alternatingly with the charging voltage supplied by the charging source 25, which for example may be about 400V.

Figure 4C:
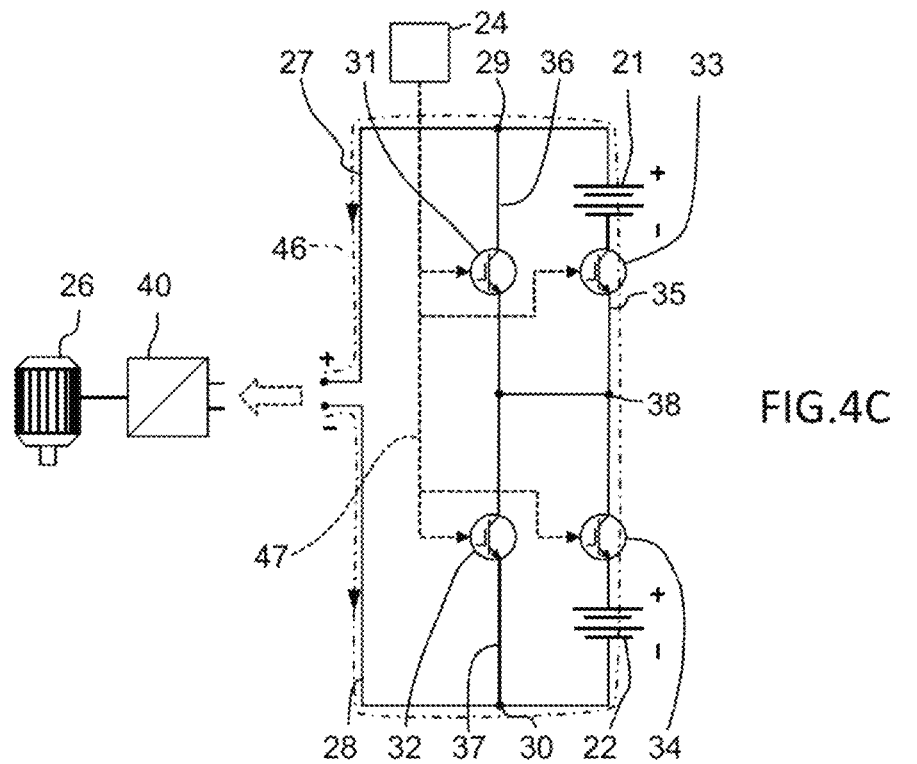

Moreover, with reference to FIG. 4C, when the electronic control system 24 controls the first and second high-power switching semiconductor devices 31, 32 to be in an open state, i.e. non-conducting state, and the third and fourth high-power switching semiconductor devices 33, 34 to be in a closed state, i.e. a conducting state, the accumulated voltage level of both the first and second high-voltage batteries 21, 22 is available between the positive and negative DC buses 27, 28, e.g. about 800V when each of the first and second high-voltage batteries 21, 22 delivers a voltage level of about 400V. This operating state typically corresponds to a driving state of the electric vehicle, wherein the full voltage level of the combined first and second high-voltage batteries 21, 22 is supplied to a vehicle electrical traction machine 26 via an electric power converter 40, such as for example an inverter. This scenario is schematically illustrated in FIG. 4C, wherein the dash-dotted line 46 illustrates the current path.

In other words, the power supply system may according to some example embodiments comprise a first bypass line 36 connected in parallel with the first high-voltage battery unit 21, wherein the first bypass line 36 includes a first high-power switching semiconductor device 31 for controlling a bypass current flowing through the first bypass line 36. Moreover, the power supply system comprises a second bypass line 37 connected in parallel with the second high-voltage battery unit 22, wherein the second bypass line 37 includes a second high-power switching semiconductor device 32 for controlling a bypass current flowing through the second bypass line 37.

Furthermore, the power supply system may according to some example embodiments comprise a third high-power switching semiconductor device 33 connected in series with the first high-voltage battery unit 21 and configured for selectively isolating the first high-voltage battery unit 21 from the power supply system, and a fourth high-power switching semiconductor device 34 connected in series with the second high-voltage battery unit 22 and configured for selectively isolating the second high-voltage battery unit 22 from the power supply system.

The high-power switching semiconductor devices 31-34 may have various designs, such as for example Bipolar Junction Transistors (BJTs), MOSFETs, Insulated-Gate Bipolar Transistor (IGBTs), or Thyristors, such as a Gate-turn-Off thyristors (GTOs), Static Induction Thyristors (SITs), Mos-controlled Thyristors (MCTs), Reverse conducting Thyristors (RCTs), etc.

FIG. 5A shows schematically the alternating charging of the first and second high-voltage battery units 21, 22, wherein the upper plot shows the charging pattern of the first high-voltage battery unit 21 over time and the lower plot shows the charging pattern of the second high-voltage battery unit 22 over time, wherein for each of the upper and lower plots, the y-axis represent charging power in watts and the x-axis represents time in seconds.

In the illustrated example embodiment of FIG. 5A, each of the first to fourth high-power switching semiconductor devices 31-34 are switched at a frequency f. A time period T of the switching is equal to: T=T1=T2=1/f Consequently, T1 and T2 are the duration of the pulses for charging the first and second high-voltage battery units 21, 22, respectively.

The parameter t_on is the amount of time the first and second high-voltage battery units 21, 22 are charged during the a time period T, and t_off is the amount of time the first and second high-voltage battery units 21, 22 are not charged during the time period T. The duty cycle D of operation, i.e. charging of each of the first and second high-voltage battery units 21, 22, is $$D = \frac{t \text{on}}{(t \text{on} + t \text{off})}.$$

The duty cycle may be selected to be about 25-50%, specifically about 40-50%, and more specifically 50%. The duty cycle may be selected depending on the specific operating conditions, such as battery temperature, state of charge, etc.

FIG. 5B shows schematically a corresponding state of charge (SOC) of each of the first and second high-voltage battery units 21, 22 over time. During time period t1, when the first high-voltage battery unit 21 is supplied with a charging current and the second high-voltage battery unit 22 is isolated, the state of charge of the first high-voltage battery unit 21 increases correspondingly, while the state of charge of the second high-voltage battery unit 22 remains constant. Similarly, during time period t2, when the second high-voltage battery unit 22 is supplied with a charging current and the first high-voltage battery unit 21 is isolated, the state of charge of the second high-voltage battery unit 22 increases correspondingly, while the state of charge of the first high-voltage battery unit 21 remains constant.

Figure 6A:
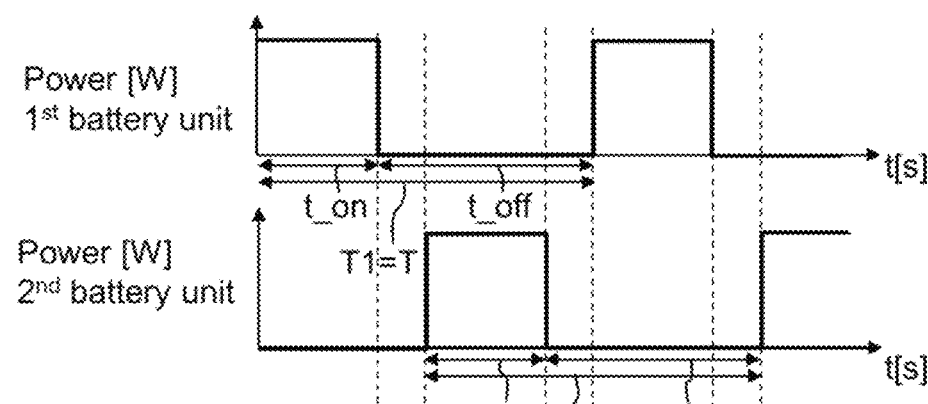
FIGS. 6A-6B show schematically the pulsed charging currents of the first and second high-voltage battery units as in FIGS. 5A-5B but with a different duty rate, FIG. 7 show schematically an example embodiment of a layout of the connection of the circuit arrangement to the charging station and propulsion machine, respectively.
Figure 6B:
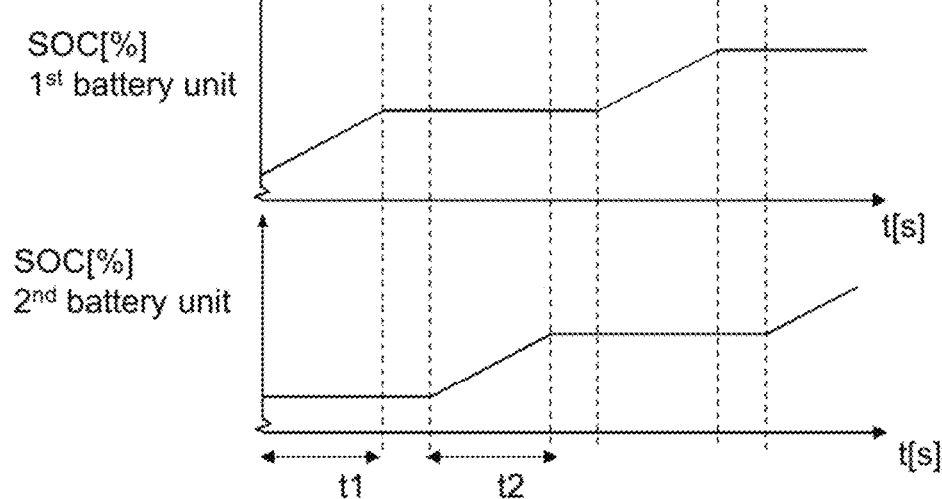

FIGS. 6A and 6B show schematically the alternating charging of the first and second high-voltage battery units 21, 22 over time, as well as the corresponding state of charge (SOC), corresponding to FIGS. 5A and 5B, but with a lower duty rate, in particular about 40% duty rate.

The charging duty-rate of the first and second high-voltage battery units 21, 22 is equal in the example embodiment described with reference to FIGS. 6A and 6B, but charging duty-rate of the first high-voltage battery unit 21 may alternatively differ from the charging duty-rate of the second high-voltage battery unit 22, for example for equalizing a difference in state of charge and/or voltage level of the first and second high-voltage battery units 21, 22.

As described above, the electronic control system 24 is configured for routing high-voltage DC received from a vehicle external charging source 25 to the first high-voltage battery unit 21 and to the second high-voltage battery unit 22 during a charging mode, and supplying high-voltage DC from both the first and second high-voltage battery units 21, 22 to the electrical traction machine 26 during a power supply mode. The circuit layout may have various designs for accomplishing these tasks. One example design is described below with reference to FIG. 7, but the circuit layout is not restricted to this particular design, and other circuit designs for accomplishing the desired routing are possible.

Figure 7:
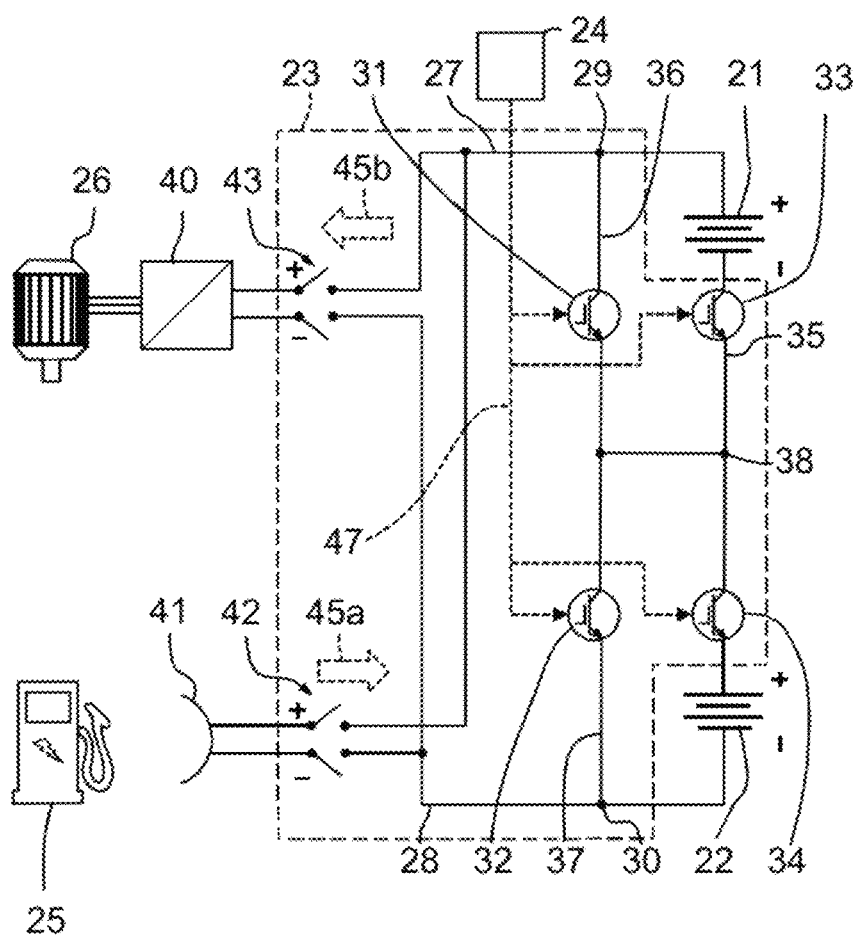

According to one example embodiment that is schematically illustrated in FIG. 7, the circuit arrangement 23 may include a first pair of circuit breakers 42 configured for connecting the positive and negative DC buses 27, 28 to a charging inlet 41, which is configured for being connected with a charging connector of a charging source 25 during charging of the first and second high-voltage battery units 21, 22. Moreover, the circuit arrangement 23 may further include a second pair of circuit breakers 43 configured for connecting the positive and negative DC buses 27, 28 with a power converter 40, such as for example an inverter, associated with the electrical traction machine 26.

The first pair of circuit breakers 42 may be set in closed state, and the second pair of circuit breakers 43 may be set in open state, during charging of the first and second high-voltage battery units 21, 22, as schematically indicated be the dashed right-arrow 45a. Similarly, the first pair of circuit breakers 42 may be set in open state, and the second pair of circuit breakers 43 may be set in closed state, during powering of the electrical traction machine 26 associated with for example driving of the electrical vehicle, as schematically indicated be the dashed left-arrow 45b.

As schematically illustrated in the example circuit layout described with reference to FIG. 7, the charging inlet 41 is connected directly to the positive and negative DC buses 27, 28 via the first pair of circuit breakers 42, and thus not via a DC/DC converter. In other words, the power supply system comprises a charging inlet 41 configured for, during a charging mode of the first and second high-voltage battery units 21, 22, receiving high-voltage DC from a vehicle external charging source 25 for charging of the first and second high-voltage battery units 21, 22, wherein the power supply system is free from a DC/DC converter in a charging current path between the charging inlet 41 and the first and second high-voltage battery units 21, 22.

Common for all example embodiments described above is that the first high-voltage battery unit 21 in a fully charged state may have a first voltage level, that the second high-voltage battery unit 22 in a fully charged state may have a second voltage level that does not differ more than 10% from the first voltage level, that the circuit arrangement 23 is configured for routing a high-voltage DC from the vehicle external charging source 25 to each of the first and second high-voltage battery units 21, 22 having a third voltage level that does not differ more than 10% from any of the first and second voltage levels, and that the circuit arrangement 23 is configured for supplying a high-voltage DC for driving the vehicle electrical traction machine 26 at a power supply output, such as at the second pair of circuit breakers 43, having a fourth voltage level that amounts to substantially the sum of the first and second voltage levels.

In particular, the fourth voltage level may be in the range of +/−10%, specifically +/−5%, of the sum of the first and second voltage levels.

As schematically illustrated in FIGS. 2, 3, 4A-4C and 7, the electronic control system 24, which may include a single electronic control unit (ECU), or a system composed of a plurality of cooperating electronic control units operating a more distributed manner, is configured for controlling operation of the plurality of high-power switching semiconductor devices 31-34, for example via wired conductors 47.

An electrical battery unit, such as for example a Li-Ion battery unit, has a frequency dependent battery internal impedance. This is schematically illustrate in FIG. 8, which shows the AC impedance magnitude [|Z|] in ohm as a function of pulse charging frequency. According to this example plot, the minimum AC impedance is available at about 2000 Hz pulse charging frequency, as marked with a ring 48 in FIG. 8.

Figure 8:
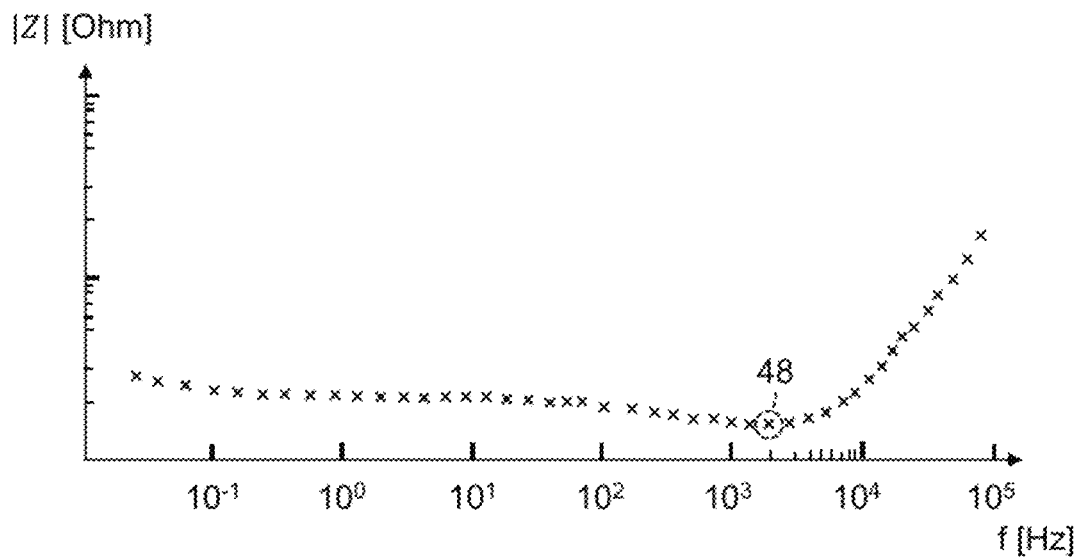
FIG. 8 shows schematically the impedance of a battery as a function of frequency.

The impedance plot of FIG. 8 is dependent on state of charge and temperature of the battery unit.

Figure 9:
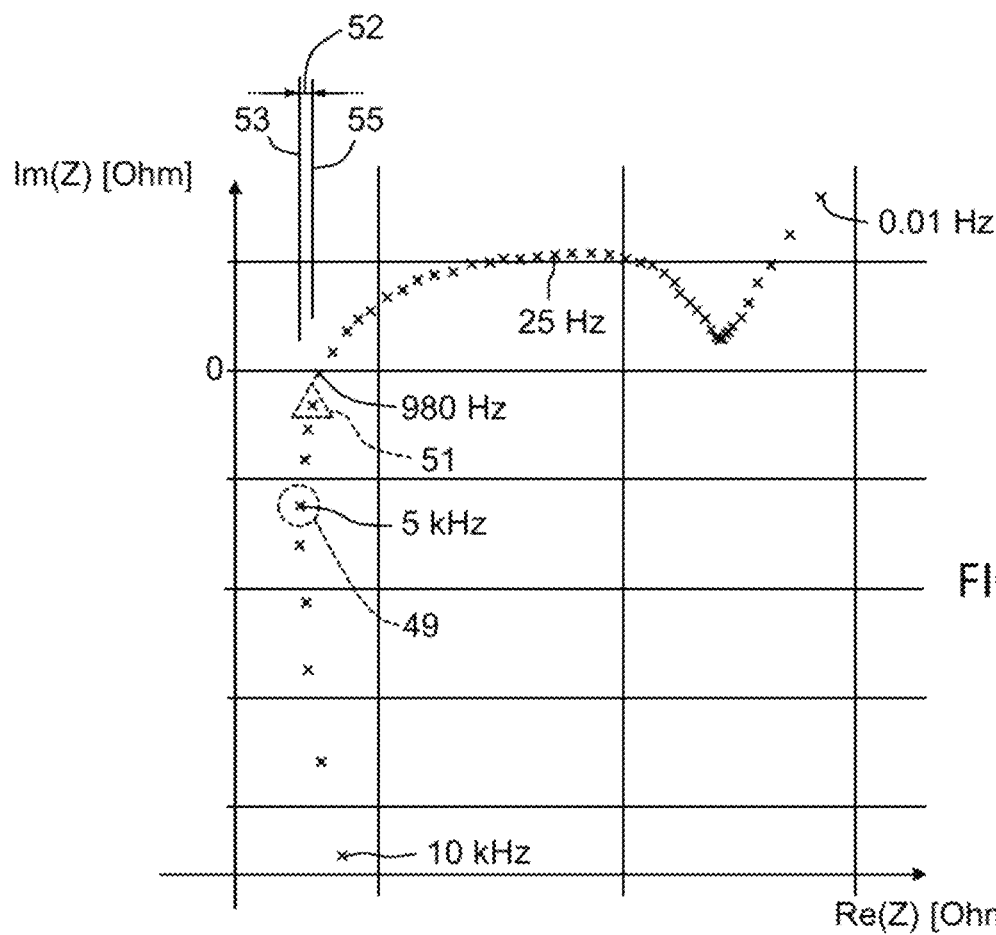
FIG. 9 shows schematically a Nyqvist plot of the impedance of a battery as a function of frequency.

The battery internal impedance is composed of a real part [Re(Z)] and an imaginary part [Im(Z)], which parts jointly define a phase angle. This may for example be illustrated by a Nyquist plot, as schematically illustrated in FIG. 9, which has the real part [Re(Z)] of the battery internal impedance along the x-axis and the imaginary part [Im(Z)] along the y-axis. The real part [Re(Z)] of the battery internal impedance is also known as the resistive impedance of the battery.

Consequently, a minimum resistive impedance of the battery unit represented by the Nyquist plot of FIG. 9 may be identified at about 5 kHz, as marked with a ring 49 in FIG. 9.

Pulse charging of the first and second high-voltage battery units 21, 22 may in some example embodiments preferably be performed at a pulse charging frequency corresponding to the minimum resistive impedance of the first and/or second high-voltage battery unit 21, 22, because this results in minimal resistive losses, e.g. minimal thermal losses.

In scenarios when the minimum resistive impedance is difficult to obtain or is unknown, but the minimal impedance magnitude [|Z|] is known or may be determined, pulse charging of the first and second high-voltage battery units 21, 22 may alternatively be performed at a pulse charging frequency corresponding to the minimal impedance magnitude of the first and/or second high-voltage battery units 21, 22.

The selected alternating frequency associated with a battery minimal impedance magnitude or a battery minimum resistive impedance used for routing high-voltage DC received from a vehicle external charging source to the first and second high-voltage battery units 21, 22 may not necessarily correspond to an alternating frequency associated with an absolute minimal impedance or minimal resistive part of the impedance, but must be read in the context of a selected sampling interval, as depicted by the crosses in FIGS. 8 and 9. In other words, the selected alternating frequency may correspond to the sample, e.g. "cross" in FIGS. 8 and 9, that is associated with the smallest battery impedance magnitude or battery resistive impedance out of the tested sample set, but depending on the number of samples, i.e. the resolution of the sample set, the selected alternating frequency may deviate more or less from an alternating frequency associated with an absolute minimal impedance or minimal resistive part of the impedance of the first and/or second high-voltage battery units 21, 22.

Consequently, in some example embodiments, the terms "frequency associated with a battery minimal impedance magnitude" and "frequency associated with a battery minimum resistive impedance" may be deemed corresponding to a frequency +/−10%, specifically +/−5%, and more specifically +/−2%, from an absolute minimal impedance or minimal resistive part of the impedance, for a given battery state of charge and battery temperature level, and possibly also battery state of health.

Moreover, the selected alternating frequency may also deviate from an alternating frequency corresponding to the sample, e.g. "cross" in FIG. 8 or 9, associated with battery minimal internal resistance or battery minimal internal impedance of the first and/or second high-voltage battery units 21, 22, to an extent that said battery minimal internal resistance or battery minimal internal impedance does not deviate more than +/−5%, specifically +/−2%, from said sample, e.g. "cross" in FIG. 8 or 9, associated with battery minimal internal resistance or battery minimal internal impedance of the first and/or second high-voltage battery units 21, 22.

For example, with reference to the example of FIG. 9, a first alternating frequency corresponding to the "cross" in FIG. 9 that is marked with a circle 49 may be associated with a first battery minimal internal resistive impedance Re(Ze) 53 of the tested battery unit, which first battery minimal internal resistive impedance Re(Ze) 53 corresponds to the smallest battery internal resistive impedance Re(Ze) out of the set of samples. Moreover, a second alternating frequency corresponding to the "cross" in FIG. 9 that is marked with a triangle 51 may be associated with a second battery internal resistive impedance Re(Ze) 55 that does not deviate more than +/−5%, specifically +/−2%, from the first battery minimal internal resistive impedance Re(Ze) 53. When selecting a suitable alternating frequency for routing the high-voltage DC to the first and second high-voltage battery units 21, 22, the system may select the second alternating frequency although not strictly associated with the absolute smallest battery internal resistive impedance Re(Ze) out of the set of samples, but since the second battery internal resistive impedance Re(Ze) 55 that does not deviate 52 more than 5% from the first battery minimal internal resistive impedance Re(Ze) 53, the loss in battery internal thermal efficiency may in some circumstance be outweighed by benefits resulting from the significant reduced switching frequency of the second alternating frequency compared with the first alternating frequency, such as reduced power consumption and/or cost of the plurality of high-power switching semiconductor devices 31-34, etc.

The internal impedance of a battery unit at a certain AC frequency, at a certain battery unit state of charge and a certain battery unit temperature, may for example be determined by supplying an AC signal having a known current level and frequency to the positive and negative terminals of a battery unit, measuring the resulting voltage level and phase difference, and calculating the internal impedance. Alternatively, the internal impedance may be determined by supplying an AC signal having a known voltage level and frequency to the positive and negative terminals of a battery unit, measuring the resulting current level and phase difference, and calculating the internal impedance.

When having determined the internal impedance or the real part of the impedance of a battery unit at a plurality of different frequencies, as for example illustrated by the individual crosses in the plot of FIG. 8, the minimal resistive impedance or minimal impedance magnitude [|Z|] may be identified for a specific battery unit state of charge and temperature level.

Specifically, according to some example embodiments, when a controlled alternating current $I(t)=I_{max} \sin(2\pi ft)$ is supplied to the two terminals of the battery unit, the voltage response is $V(t)=V_{max} \sin(2\pi ft+\emptyset)$. Battery unit impedance may then be determined by the equation $$Z(f) = \frac{V_{max}}{I_{max}} e^{j\emptyset},$$

where the phase angle is $\emptyset$, the absolute value of the impedance is $$|Z| = \frac{V_{max}}{I_{max}},$$

and the resistive (Real) part of impedance $$\text{Re}(Z) = \frac{V_{max}}{I_{max}} \cos \emptyset.$$

In other words, the electronic control system 24 may be configured for controlling operation of the plurality of high-power switching semiconductor devices 31-34 to operate with an alternating frequency equal to a frequency associated with a battery minimal internal resistance or battery minimal internal impedance of the first and/or second high-voltage battery unit.

Hence, the frequency may be determined by either handling the first and second high-voltage battery units 21, 22 as a single battery, i.e. by supplying the AC signal to both the first and second high-voltage battery units 21, 22 connected in series, or based on one of the first and second high-voltage battery units 21, 22, i.e. by supplying the AC signal to only one of the first and second high-voltage battery units 21, 22.

Still more alternatively, the frequency may be selected from a range defined by the minimal internal resistance or battery minimal internal impedance of the first high-voltage battery unit 21 and the minimal internal resistance or battery minimal internal impedance of the second high-voltage battery unit 22. In other words, the electronic control system 24 may be configured for controlling operation of the plurality of high-power switching semiconductor devices 31-34 to operate with an alternating frequency equal to a frequency located between a frequency associated with battery minimal internal resistance or battery minimal internal impedance of the first high-voltage battery unit 21 and a frequency associated with battery minimal internal resistance or battery minimal internal impedance of the second high-voltage battery unit 22.

The process of identifying the internal impedance of a battery unit by supplying, consecutively, a series of AC signals having different frequencies, and measuring for each frequency the resulting voltage or current level and phase difference, may for example involve supplying a set of AC signals having a frequency ranging from 0.1 kHz-10 kHz with about 0.1-0.5 kHz steps. An iterative search process with increasingly narrow frequency range and finer steps may be applied.

Figure 10:
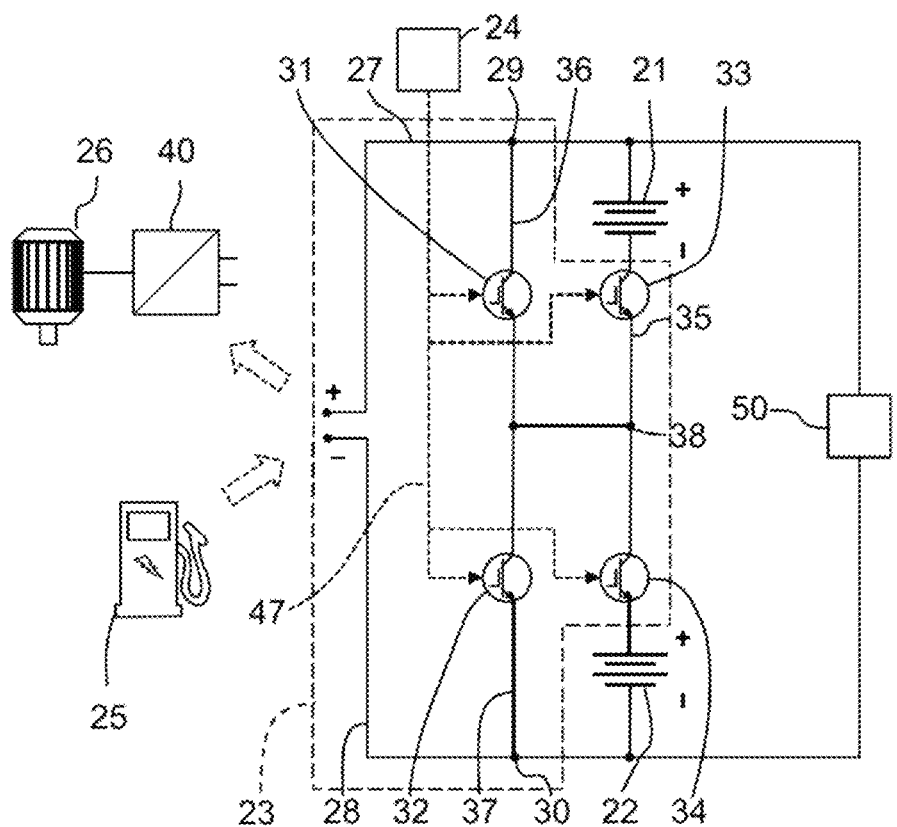
FIG. 10 shows schematically an example embodiment of the power supply system having a battery internal resistance or impedance detection arrangement according to the disclosure.

With reference to FIG. 10, the power supply system may according to some example embodiments comprise a battery internal resistance or impedance detection arrangement 50 configured for determining said frequency associated with said minimal internal resistance or minimal internal impedance of the first and/or second high-voltage battery units 21, 22.

The battery internal resistance or impedance detection arrangement 50 may for example be connected to a positive pole of the first high-voltage battery unit 21 and the negative pole of the second high-voltage battery unit 22.

The battery internal resistance or impedance detection arrangement 50 may be configured for determining said frequency associated with said minimal internal resistance or minimal internal impedance of each of the first and/or second high-voltage battery units 21, 22 by supplying an AC signal having a known current or voltage level to the positive and negative terminals of the first and/or second high-voltage battery units 21, 22, wherein the plurality of high-power switching semiconductor devices 31-34 may be used for routing the test signal to either the first and second high-voltage battery units 21, 22 individually or jointly. Moreover, significant power consumers, such as the vehicle electrical traction machine 26 and electric power converter 40, may be temporarily disconnected during the testing sequence for determining said frequency associated with said minimal internal resistance or minimal internal impedance.

According to some example embodiments, the battery internal resistance or impedance detection arrangement 50 may be configured for performing a first step of, for each of a set of different frequencies, supplying an AC signal having a certain frequency (f) to a selected battery unit out of the first and second high-voltage battery units, or to both the first and second high-voltage battery units, registering a resulting alternating voltage or current, and determining an internal impedance of the selected battery unit, and thereafter performing a second step of identifying the minimal internal resistance or minimal internal impedance of the selected battery unit or both the first and second high-voltage battery units from the collected set of internal impedances, and determining the frequency associated with said identified minimal internal resistance or minimal internal impedance.

The supplied AC signal may be a small amplitude AC signal according to $I(t)=I_{max} \sin(2\pi ft)$. Moreover, the registered resulting alternating voltage signal may have the form $V(t)=V_{max} \sin(2\pi ft+\emptyset)$, wherein $\emptyset$ is the phase angle of the selected battery unit. The frequency dependent impedance of the battery unit(s) may subsequently be determined based on the equation $$Z(f) = \frac{V_{max}}{I_{max}} e^{j\emptyset}.$$

In particular, an absolute value of the impedance is $$|Z| = \frac{V_{max}}{I_{max}},$$

and a resistive (Real) part of impedance $$\text{Re}(Z) = \frac{V_{max}}{I_{max}} \cos \emptyset.$$

The battery internal resistance or impedance detection arrangement 50 may for example include, an electrical storage system, such as a battery, an AC signal generator circuit connected to the electrical storage system, and an electronic controller configured controlling the AC signal generator circuit for supplying an AC signal with a certain frequency and a certain current or voltage to the first and/or second high-voltage battery units 21, 22. Furthermore, the electronic controller may additionally be configured for detecting a resulting alternating voltage or current signal, and for calculating the impedance of the first and/or second high-voltage battery units 21, 22, as well as the phase difference Ø between the supplied AC signal and the detected alternating voltage or current signal. Alternatively, the electronic control system 24 of the power supply system may be used for controlling said AC signal generator circuit and for calculating said impedance and phase difference Ø.

Figure 11:
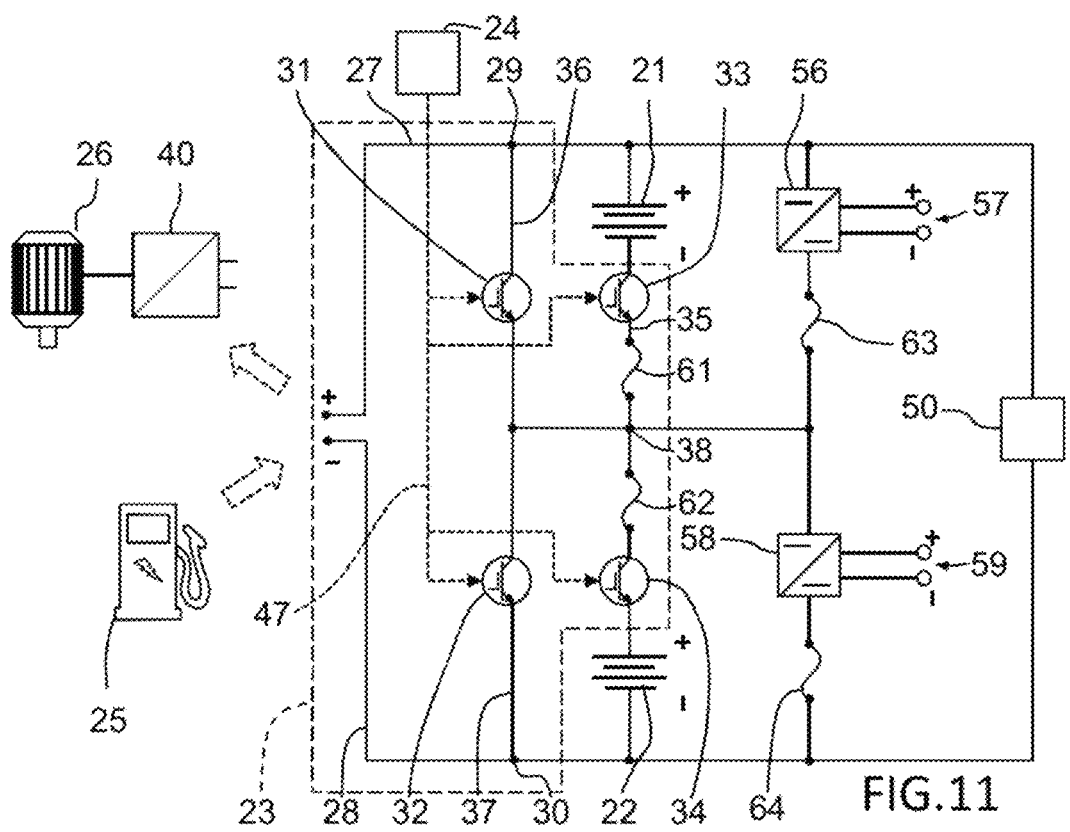
FIG. 11 shows schematically an example embodiment of the power supply system having two DC/DC converters for redundant low-voltage power supply according to the disclosure.

With reference to FIG. 11, according to some example embodiments, the power supply system may additionally comprise a first DC/DC converter 56 connected in parallel with the first high-voltage battery unit 21 and configured for providing a first low-voltage DC output 57, and a second DC/DC converter 58 connected in parallel with the second high-voltage battery unit 22 and configured for providing a second low-voltage DC output 59. Thereby, redundant low-voltage power supply is provided for example vehicle safety critical functions, such as power steering, braking, etc.

A positive input of the first DC/DC converter 56 may for example be connected to the a positive pole of the first high-voltage battery unit 21 and a negative input of the first DC/DC converter 56 may for example be connected to a negative pole of the first high-voltage battery unit 21 or to the battery intermediate conductor 35, for example at the second connection point 38. Similarly, a positive input of the second DC/DC converter 58 may for example be connected to the a positive pole of the second high-voltage battery unit 22 or to the battery intermediate conductor 35, for example at the second connection point 38, and a negative input of the second DC/DC converter 58 may for example be connected to a negative pole of the second high-voltage battery unit 22.

Moreover, a first fuse 61 may be provided connected in series with the first high-voltage battery unit 21 for isolation thereof in case of short-current or other type of similar malfunction.

In the same manner, a second fuse 62 may be provided connected in series with the second high-voltage battery unit 22 for isolation thereof in case of short-current or other type of similar malfunction.

Moreover, a third fuse 63 may be provided connected in series with the first DC/DC converter 56 for isolation thereof in case of short-current or other type of similar malfunction. Similarly, a fourth fuse 64 may be provided connected in series with the second DC/DC converter 58 for isolation thereof in case of short-current or other type of similar malfunction.

Since online execution of test process for identification of a suitable alternating frequency, for example the test process described above, at each single charging occasion may be undesirable due to for example time constraints associated with execution of the test process, or the like, a lookup data table with predetermined alternating frequencies may be provided.

A single lookup data table for the combined, series connected, first and second high-voltage battery units 21, 22 may be provided, wherein the first and second high-voltage battery units 21, 22 are handled as a single vehicle battery. Alternatively, an individual lookup data table with alternating frequencies may be provided for each of the first and second high-voltage battery units 21, 22.

Figure 12:
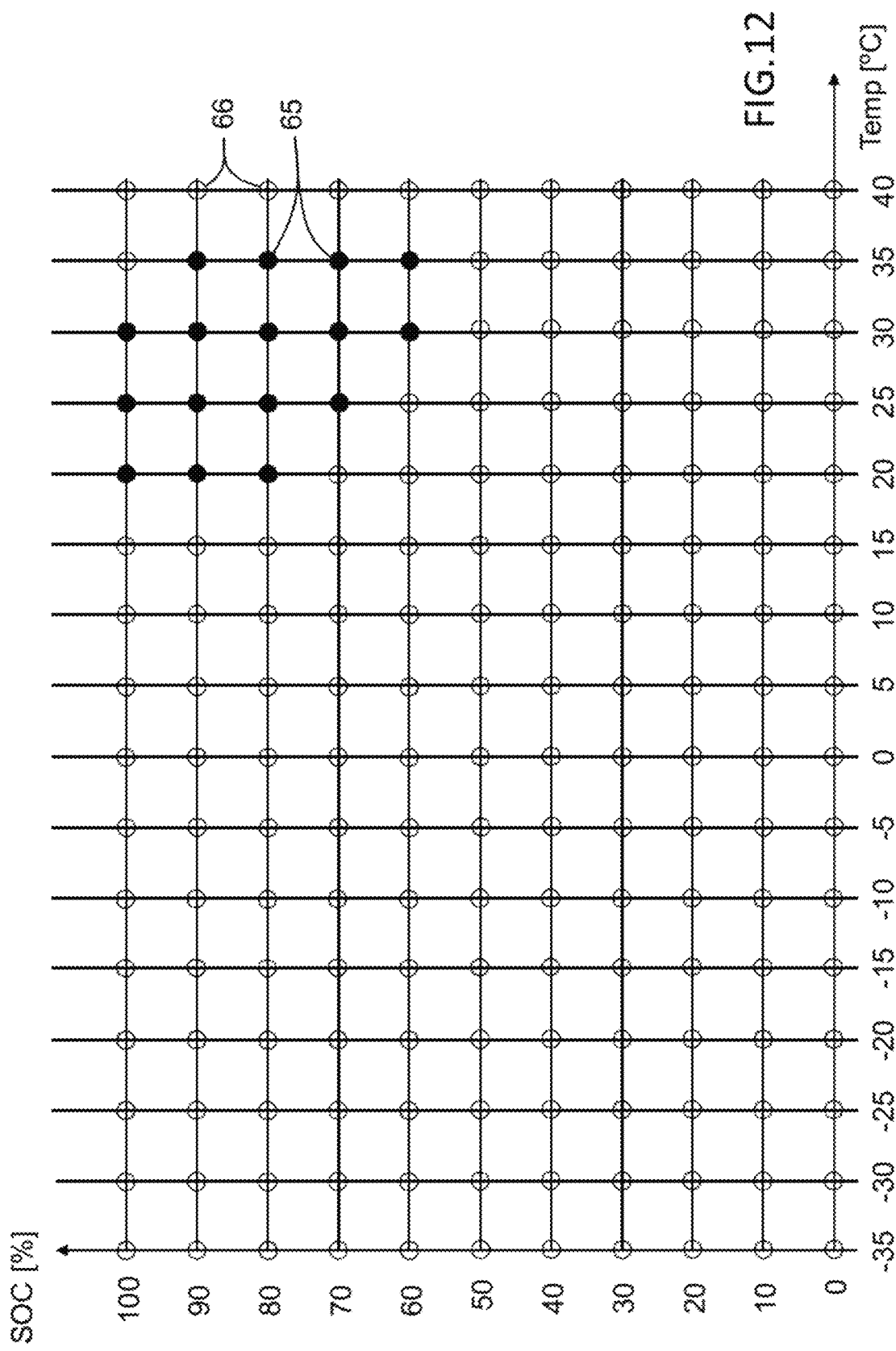
FIG. 12 shows schematically a lookup data table according to the disclosure.

FIG. 12 shows schematically a lookup data table having battery state of charge (SOC) along the y-axis and battery temperature (Temp) in Celsius along the x-axis, wherein the lookup data table provides a certain alternating frequency for each unique combination of battery state of charge and battery temperature. Consequently, when a charging event of a vehicle high-voltage battery is initiated, the power supply system may first check current battery state of charge and current battery temperature, and subsequently obtains a suitable alternating frequency from the lookup data table to be used for the charging event.

The lookup data table may additionally include battery state of health as input parameter, such that the power supply system in event of charging first checks current battery state of charge, current battery temperature, and current battery state of health and subsequently obtains a suitable alternating frequency from the lookup data table to be used for the charging event. Even further battery parameters may be used for the lookup data table.

The various alternating frequencies stored in the lookup data table may be provided based on factory settings, i.e. determined during development of the vehicle type and common for all vehicles of the same type, e.g. with the same type of power supply system. This enables offline calculation of the appropriate alternating frequencies.

However, each vehicle battery has a certain individual character in terms of battery cell composition, and each vehicle battery ages differently over time due to individual usage pattern, operating conditions, charging conditions, etc. Hence, predetermined alternating frequencies of a lookup data table based on factory settings or the like may become increasingly incorrect over time. Hence, it may be beneficial to implement an update process for reoccurring updating of appropriate alternating frequencies of the lookup data table over time based on the specific characteristic and aging of each individual vehicle battery.

This may for example be performed by supplementing each individual data entry of the lookup data table, i.e. each individual alternating frequency, with an indicator indicating an estimated correctness of the alternating frequency, wherein the indicator for example takes one or more of the following parameters into account: time since determining or storing the stored alternating frequency (age of data), usage pattern of the battery since said storing of the alternating frequency, operating conditions of the battery since said storing of the alternating frequency, charging conditions of the battery since said storing of the alternating frequency, etc.

According to some example embodiments, each individual data entry (alternating frequency) of the lookup data table may thus be supplemented with an individual age indicator, such as a time stamp, for indicating the age of the stored data. Alternatively, the age indicator may for example be an integer value reflecting for example the age of the stored data in terms of days, weeks, months or years, or the like.

For example, the age indicator may integer value reflecting the age of the stored data in terms of days, and a threshold value may be set to 30 days, such that the frequency value stored in the lookup data table is deemed valid and appropriate if the age indicator is smaller than 30, and the frequency value stored in the lookup data table is deemed invalid and inappropriate if the age indicator is equal to or larger than 30. Moreover, the age indicator of each stored frequency value within the lookup data table is increased with one every day.

Consequently, when a charging event of a vehicle high-voltage battery is initiated, the power supply system may first check current battery state of charge and current battery temperature, and subsequently check the age indicator of the associated alternating frequency provided by the lookup data table. If the age indicator indicates that the associated alternating frequency provided by the lookup data table is still reasonably valid, i.e. reasonably correct, the power supply system may use the stored value of the lookup data table. Otherwise, the power supply system may initiate an online execution of a test process for identification of an updated suitable alternating frequency, for example by means of the test process described above, and subsequently storing the updated value on the lookup data table and updating the age indicator. Thereby, a reasonable appropriateness of the used alternating frequency may be ensured, while avoiding an undesirable online recalculation of appropriate alternating frequency at the beginning of each battery charging event.

In other words, the electronic control system 24 of the power supply system may comprise a data memory having, for each of the first and second high-voltage battery units or jointly for both the first and second high-voltage battery units, a plurality of stored data records. Each of the stored data records is associated with a unique combination of a battery state of charge value and a battery temperature value and includes: a data field for storing a calculated frequency value reflecting a minimal internal resistance or minimal internal impedance of the battery at said unique combination of battery state of charge and battery temperature, and a data field for storing an age indicator indicating the age of the calculated frequency value. The electronic control system is then configured to, upon receiving an instruction to enter charging mode of the first and second high-voltage battery units 21, 22 detecting current temperature level and current state of charge level associated with the first and/or second high-voltage battery units 21, 22, and subsequently using the associated calculated frequency value from the data record as the alternating frequency if the associated age indicator indicates that the calculated frequency value is up-to-date.

The term "associated calculated frequency value" may here represent the calculated minimal resistance frequency value from the data record having a unique combination of a battery state of charge value and a battery temperature value that corresponds to, or most closely resembles, the detected current temperature level and current state of charge level.

In addition, the electronic control system 24 of the power supply system may be configured to, upon detecting that the associated age indicator indicates an outdated calculated frequency value, applying the battery internal resistance or impedance detection arrangement 50 for determining a new frequency value reflecting the minimal internal resistance or minimal internal impedance of each of the first and second high-voltage battery units 21, 22, updating the stored calculated frequency value with the new frequency value and updating the age indicator in the data record, and using said updated, new, frequency value as the alternating frequency.

In the example embodiment of FIG. 12, the circles at each crossing in the lookup data table may represent a data field having a stored frequency value reflecting a minimal internal resistance or minimal internal impedance of the battery at said unique combination of battery state of charge and battery temperature, and the fill status of the circles may represent the age indicator of that specific frequency value.

Hence, the data fields associated with filled circles 65 have an updated frequency value, and the data fields associated with non-filled circles 66 have an outdated, old, frequency value.

Consequently, of a battery charging event is initiated at 60% SOC and 25 degrees Celsius, the associated frequency value stored in the lookup data table is deemed outdated and a new frequency value is identified, for example using the battery internal resistance or impedance detection arrangement 50, and subsequently stored in the lookup data table, together with an updated age indicator. Thereafter, the new frequency value is used as alternating frequency during charging of the first and second high-voltage battery units 21, 22. In other words, the filled circles 65 in FIG. 12 reflect a vehicle that is mostly charged at a temperature range of 20-35 degrees C. and having at least 60% SOC.

Moreover, during charging of the first and second high-voltage battery units 21, 22, the battery SOC value slowly increases and the battery temperature may vary depending on charging rate, ambient temperature level, etc. Consequently, the electronic control system 24 of the power supply system may be configured to, during a charging event, upon passing a non-filled circle, i.e. upon reaching a battery SOC and battery temperature reflecting an outdated frequency value of the lookup data table, trigger the battery internal resistance or impedance detection arrangement 50 for determining a new frequency value reflecting the minimal internal resistance or minimal internal impedance said outdated frequency value and updating the stored calculated frequency value with the new frequency value and updating the associated age indicator.

The charging process of the first and second high-voltage battery units 21, 22 may be temporarily halted during operation of the battery internal resistance or impedance detection arrangement 50. Alternatively, charging process of the first and second high-voltage battery units 21, 22 may operate simultaneously with operation of the battery internal resistance or impedance detection arrangement 50.

In some example embodiments, as described above, the lookup data table may from manufacturing of the vehicle be filled with alternating frequencies based on factory settings. However, according to an alternative example embodiment, the lookup data table may instead be empty at the beginning, and instead being slowly filled with alternating frequencies during use of the vehicle, by means of the update process described above.

Figure 13:
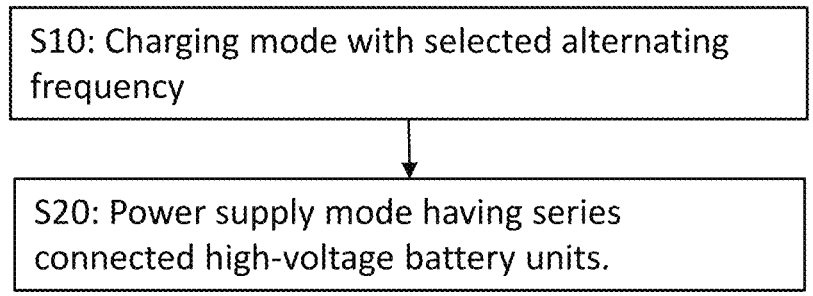
FIGS. 13-16 show schematically the basic steps of various example embodiments of a method for operating a power supply system for an electric vehicle drivetrain according to the disclosure.

The basic steps of a method of one example embodiment for operating a power supply system for an electric vehicle drivetrain is described below with reference to FIG. 13, wherein the power supply system includes a first high-voltage battery unit 21 connected in series with a second high-voltage battery unit 22. The method comprises a first step S10 of, during a charging mode of the first and second high-voltage battery units 21, 22, routing, by means of a circuit arrangement 23 having a plurality of high-power switching semiconductor devices 31-34 connected to the first and second high-voltage battery units 21, 22, high-voltage DC received from a vehicle external charging source 25 alternatingly to the first high-voltage battery unit 21 and to the second high-voltage battery unit 22, with an alternating frequency of at least 100 Hz, specifically at least 500 Hz, and more specifically in the range of 100-10000 Hz. The method further comprises a second step S20 of, during a power supply mode of the power supply system, supplying, by means of said circuit arrangement 23, high-voltage DC from both the first and second high-voltage battery units 21, 22 for driving a vehicle electrical traction machine 26 of the electric vehicle drivetrain, wherein the supplied high-voltage DC has a voltage level corresponding to the accumulated voltage level of the series connected first and second high-voltage battery units 21, 22.

Figure 14:
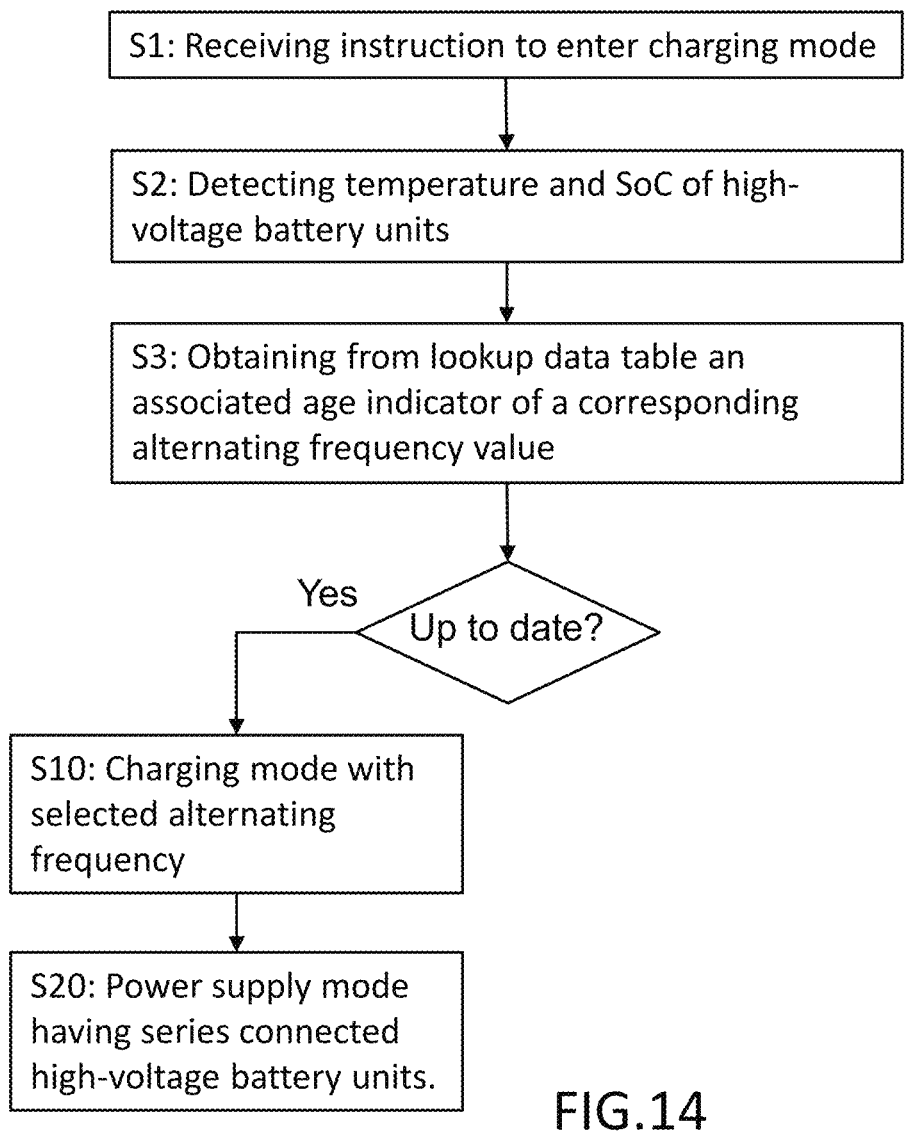

With reference to FIG. 14, according to a further example embodiment of the method, the power supply system includes, for each of the first and second high-voltage battery units or jointly for both the first and second high-voltage battery units, a lookup data table having a plurality calculated frequency values, each reflecting a minimal internal resistance or minimal internal impedance of the battery for a unique combination of battery state of charge and battery temperature and each being associated with an age indicator indicating the age of the calculated frequency value. The method further comprises first initialisation step S1 of receiving an instruction to enter charging mode of the first and second high-voltage battery units 21, 22. The method further comprises second initialisation step S2 of detecting current temperature level and current state of charge level associated with the first and/or second high-voltage battery units 21, 22. The method further comprises a third initialisation step S3 of obtaining from the lookup data table the associated age indicator of the corresponding calculated frequency value. Thereafter, when the associated age indicator indicates that the calculated frequency value is up-to-date, for example when the age indicator is smaller than a threshold value, the method involves a first step S10 of routing high-voltage DC alternatingly to the first high-voltage battery unit 21 and to the second high-voltage battery unit 22, while using the calculated frequency value from the lookup data table as the alternating frequency, as described with reference to FIG. 13.

Figure 15:
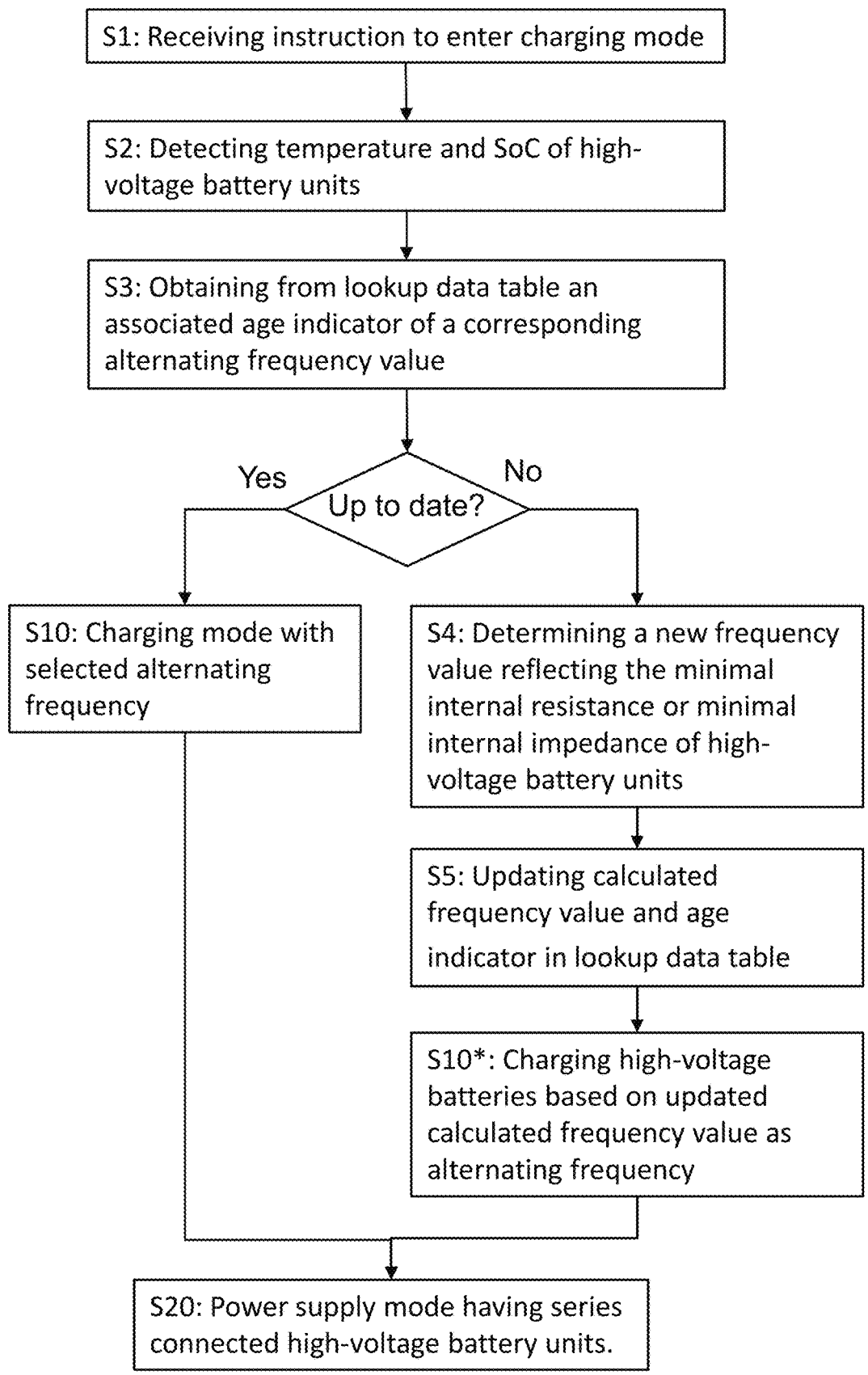

With reference to FIG. 15, according to a further example embodiment of the method, the method involves, in addition to the method steps described with reference to FIG. 14, when the associated age indicator indicates that the calculated frequency value is outdated, a fourth initialisation step S4 of applying a battery internal resistance or impedance detection arrangement for determining a new frequency value reflecting the minimal internal resistance or minimal internal impedance of each of the first and second high-voltage battery units 21, 22. The method further comprises a fifth initialisation step S5 of updating the stored calculated frequency value and the age indicator in the lookup data table, and a first step S10* of routing high-voltage DC alternatingly to the first high-voltage battery unit 21 and to the second high-voltage battery unit 22, while using said new, updated, calculated frequency value as the alternating frequency.

Figure 16:
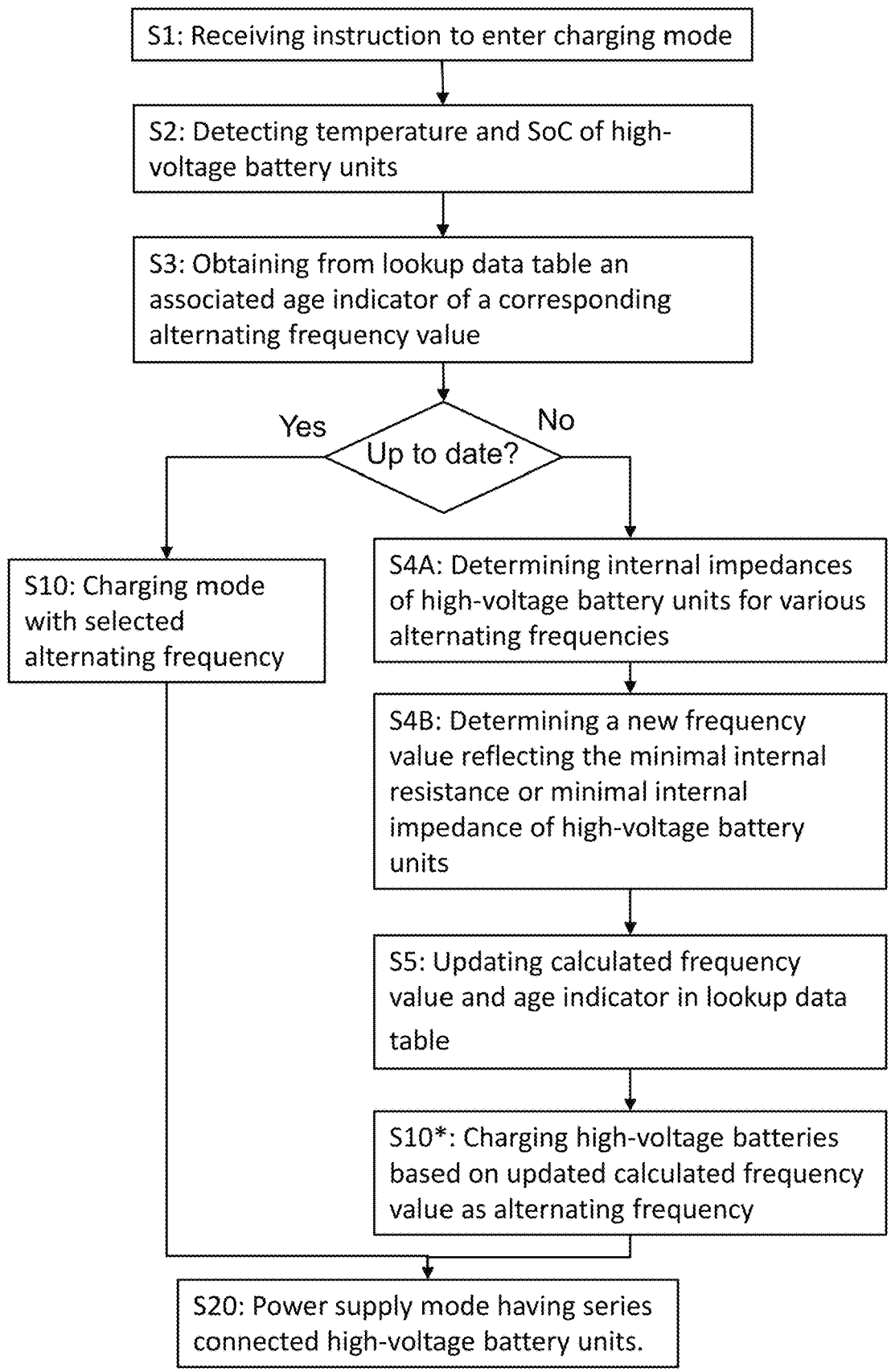

With reference to FIG. 16, according to a further example embodiment of the method, the fourth initialisation step S4 of applying the battery internal resistance or impedance detection arrangement for determining a new calculated frequency value reflecting the minimal internal resistance or minimal internal impedance of each of the first and second high-voltage battery units involves a first substep S4a of, for each of a set of different frequencies, supplying an AC signal having a certain frequency (f) to a selected battery unit out of the first and second high-voltage battery units or to both the first and second high-voltage battery units, registering a set of resulting alternating voltages, and determining a set of internal impedances of the selected battery unit or both the first and second high-voltage battery units based on the set of resulting alternating voltages, and subsequently a second sub step S4b of identifying the minimal internal resistance or minimal internal impedance of the selected battery unit or both the first and second high-voltage battery units from the collected set of internal impedances, and determining the frequency associated with said identified minimal internal resistance or minimal internal impedance.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

What is claimed is:

1. A power supply system for an electric vehicle drivetrain, the power supply system comprising:
   a first high-voltage battery unit,
   a second high-voltage battery unit connected in series with the first high-voltage battery unit,
   a circuit arrangement having a plurality of high-power switching semiconductor devices connected to the first and second high-voltage battery units,
   an electronic control system configured for controlling operation of the plurality of high-power switching semiconductor devices for:
      during a charging mode of the first and second high-voltage battery units, routing high-voltage DC received from a vehicle external charging source alternatingly to the first high-voltage battery unit and to the second high-voltage battery unit, with an alternating frequency of at least 100 Hz, and
   during a power supply mode of the power supply system, supplying high-voltage DC from both the first and second high-voltage battery units for driving a vehicle electrical traction machine of the electric vehicle drivetrain, wherein the supplied high-voltage DC has a voltage level corresponding to the accumulated voltage level of the series connected first and second high-voltage battery units
      wherein the electronic control system comprises a lookup data table having a plurality of stored data records, each associated with:
   a unique combination of a battery state of charge value and a battery temperature value, and
   a data field storing a calculated frequency value associated with said unique combination of battery state of charge and battery temperature,
      wherein the electronic control system is configured to, upon receiving an instruction to enter the charging mode of the first and second high-voltage battery units, detect current battery temperature level and current battery state of charge of the first and/or second high-voltage battery units, and subsequently use an associated calculated frequency value from the corresponding data record as the alternating frequency.

2. The power supply system according to claim 1, wherein the electronic control system is configured for controlling operation of the plurality of high-power switching semiconductor devices to operate with an alternating frequency equal to:
   a frequency associated with a battery minimal internal resistance or battery minimal internal impedance of the first and/or second high-voltage battery unit; or
   a frequency located between a frequency associated with battery minimal internal resistance or battery minimal internal impedance of the first high-voltage battery unit and a frequency associated with battery minimal internal resistance or battery minimal internal impedance of the second high-voltage battery unit.

3. The power supply system according to claim 2, further comprising a battery internal resistance or impedance detection arrangement configured for determining said frequency associated with said minimal internal resistance or minimal internal impedance of the first and/or second high-voltage battery units.

4. The power supply system according to claim 2, wherein the battery internal resistance or impedance detection arrangement is configured for:
   first, for each of a set of different frequencies, supplying a AC signal having a certain frequency to a selected high-voltage battery unit out of the first and second high-voltage battery units or to both the first and second high-voltage battery units, registering a resulting alternating voltage or current, and determining an internal impedance of the selected high-voltage battery unit or both the first and second high-voltage battery units, and
   secondly, identifying the minimal internal resistance or minimal internal impedance of the selected high-voltage battery unit or both the first and second high-voltage battery units from the collected set of internal impedances, and determining the frequency associated with said identified minimal internal resistance or minimal internal impedance.

5. The power supply system according to claim 1, wherein each data record is additionally associated with:
   a data field for storing an age indicator indicating the age of the calculated frequency value,
   wherein the electronic control system is configured to, upon receiving the instruction to enter charging mode of the first and second high-voltage battery units, use the associated calculated frequency value from the corresponding data record as the alternating frequency if the associated age indicator indicates that the calculated frequency value is up-to-date.

6. The power supply system according to claim 5, wherein the electronic control system is configured to, upon detecting that the associated age indicator indicates an outdated calculated frequency value, applying the battery internal resistance or impedance detection arrangement for determining a new frequency value reflecting the minimal internal resistance or minimal internal impedance of each of the first and second high-voltage battery units, updating the stored calculated frequency value and the age indicator in the data record, and using said new, updated, calculated frequency value as the alternating frequency.

7. The power supply system according to claim 1, wherein the first high-voltage battery unit in a fully charged state has a first voltage level, wherein the second high-voltage battery unit in a fully charged state has a second voltage level that does not differ more than 10% from the first voltage level, wherein the circuit arrangement is configured for routing a high-voltage DC from the vehicle external charging source to each of the first and second high-voltage battery units having a third voltage level that does not differ more than 10% from any of the first and second voltage levels, and wherein the circuit arrangement is configured for supplying a high-voltage DC for driving the vehicle electrical traction machine at a power supply output having a fourth voltage level that amounts to substantially the sum of the first and second voltage levels.

8. The power supply system according to claim 1, wherein the power supply system comprises a charging inlet configured for, during a charging mode of the first and second high-voltage battery units, receiving high-voltage DC from a vehicle external charging source for charging of the first and second high-voltage battery units, and wherein the power supply system is free from a DC/DC converter in the charging current path between the charging inlet and the first and second high-voltage battery units.

9. The power supply system according to claim 1, wherein the circuit arrangement comprises:
   a first bypass line connected in parallel with the first high-voltage battery unit, wherein the first bypass line includes a first high-power switching semiconductor device for controlling a bypass current flowing through the first bypass line, and
   a second bypass line connected in parallel with the second high-voltage battery unit, wherein the second bypass line includes a second high-power switching semiconductor device for controlling a bypass current flowing through the second bypass line.

10. The power supply system according to claim 9, wherein the circuit arrangement comprises:
   a third high-power switching semiconductor device connected in series with the first high-voltage battery unit and configured for selectively isolating the first high-voltage battery unit from the power supply system, and
   a fourth high-power switching semiconductor device connected in series with the second high-voltage battery unit and configured for selectively isolating the second high-voltage battery unit from the power supply system.

11. The power supply system according to claim 1, wherein the power supply system comprises:
   a first DC/DC converter connected in parallel with the first high-voltage battery unit and configured for providing a first low-voltage DC output,
   a second DC/DC converter connected in parallel with the second high-voltage battery unit and configured for providing a second low-voltage DC output.

12. The power supply system according to claim 1, wherein the calculated frequency value of each data record reflects a minimal internal resistance or minimal internal impedance of the battery at said unique combination of battery state of charge and battery temperature.

13. A method for operating a power supply system for an electric vehicle drivetrain, wherein the power supply system includes a first high-voltage battery unit connected in series with a second high-voltage battery unit, wherein the power supply system includes a lookup data table having a plurality calculated frequency values, each associated with a unique combination of battery state of charge and battery temperature, the method comprising:
   during a charging mode of the first and second high-voltage battery units, detecting current temperature level and current state of charge level associated with the first and/or second high-voltage battery units, obtaining from the lookup data table the associated calculated frequency value, routing, by means of a circuit arrangement having a plurality of high-power switching semiconductor devices connected to the first and second high-voltage battery units, high-voltage DC received from a vehicle external charging source alternatingly to the first high-voltage battery unit and to the second high-voltage battery unit, with an alternating frequency of at least 100 Hz, and using the calculated frequency value from the lookup data table as the alternating frequency, and during a power supply mode of the power supply system, supplying, by means of said circuit arrangement, high-voltage DC from both the first and second high-voltage battery units for driving a vehicle electrical traction machine of the electric vehicle drivetrain, wherein the supplied high-voltage DC has a voltage level corresponding to the accumulated voltage level of the series connected first and second high-voltage battery units.

14. The method according to claim 13, wherein the lookup data table has a plurality calculated frequency values, each reflecting a minimal internal resistance or minimal internal impedance of the battery for a unique combination of battery state of charge and battery temperature and each being associated with an age indicator indicating the age of the calculated frequency value, and wherein the method further comprising:

obtaining from the lookup data table the associated age indicator of the corresponding calculated frequency value, when the associated age indicator indicates that the calculated frequency value is up-to-date, using the calculated frequency value from the lookup data table as the alternating frequency.

15. The method according to claim 14, further comprising:

when the associated age indicator indicates that the calculated frequency value is outdated, applying a battery internal resistance or impedance detection arrangement for determining a new frequency value reflecting the minimal internal resistance or minimal internal impedance of each of the first and second high-voltage battery units, updating the stored calculated frequency value and the age indicator in the lookup data table, and using said new, updated, calculated frequency value as the alternating frequency.

16. The method according to claim 15, where the step of applying the battery internal resistance or impedance detection arrangement for determining a new frequency value reflecting the minimal internal resistance or minimal internal impedance of each of the first and second high-voltage battery units involves:

for each of a set of different frequencies, supplying an AC signal having a certain frequency to a selected high-voltage battery unit out of the first and second high-voltage battery units, registering a set of resulting alternating voltages, and determining a set of internal impedances of the selected high-voltage battery unit, and subsequently identifying the minimal internal resistance or minimal internal impedance of the selected high-voltage battery unit from the collected set of internal impedances, and determining the frequency associated with said identified minimal internal resistance or minimal internal impedance.

17. The method according to claim 13, wherein each of the plurality calculated frequency values of the lookup data table is reflecting a minimal internal resistance or minimal internal impedance of the battery for a unique combination of battery state of charge and battery temperature.

\* \* \* \* \*